April 25, 1939.   S. BRAND   2,155,928
CASH REGISTER
Filed June 12, 1935   14 Sheets-Sheet 2

Inventor
Samuel Brand
By
Earl Benst
His Attorney

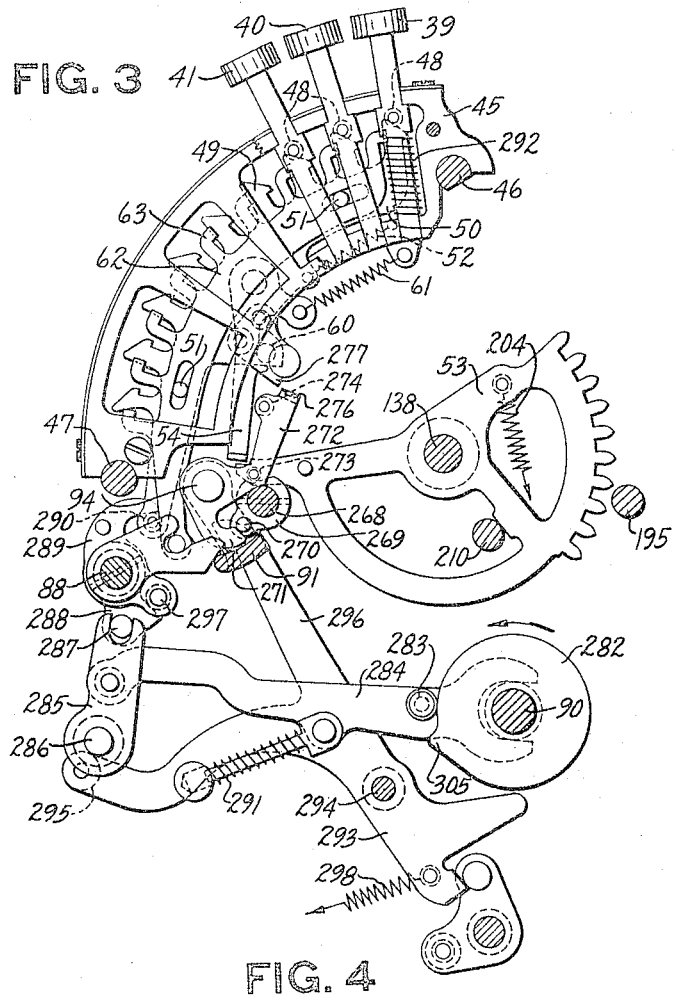
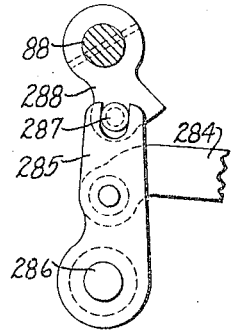
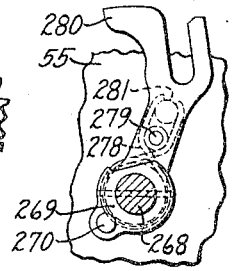

Inventor
Samuel Brand

April 25, 1939.  S. BRAND.  2,155,928
CASH REGISTER
Filed June 12, 1935  14 Sheets-Sheet 6

Inventor
Samuel Brand
By
Carl Beust
His Attorney

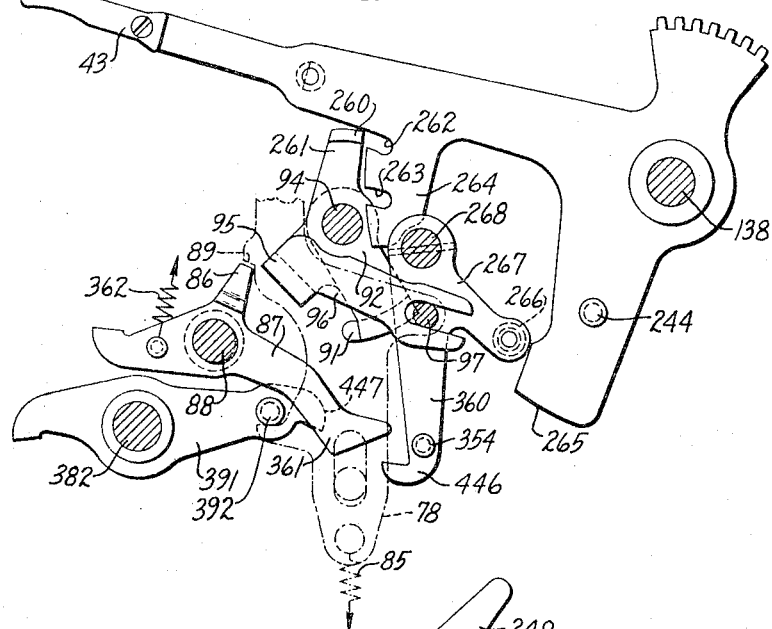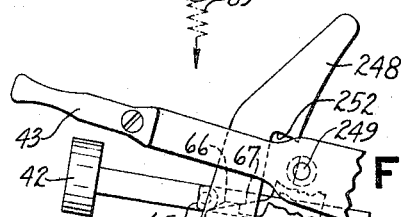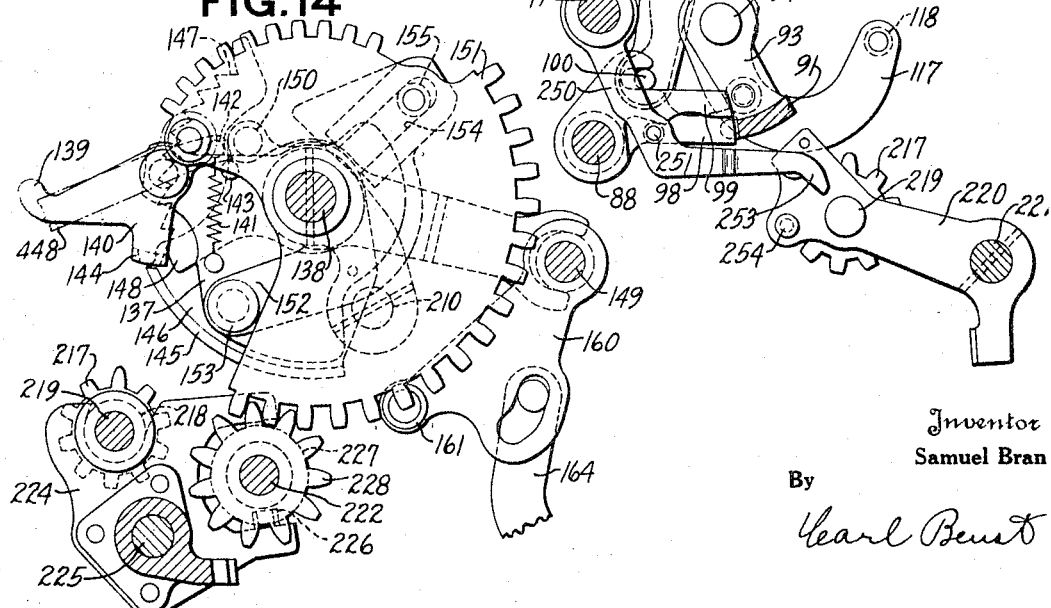

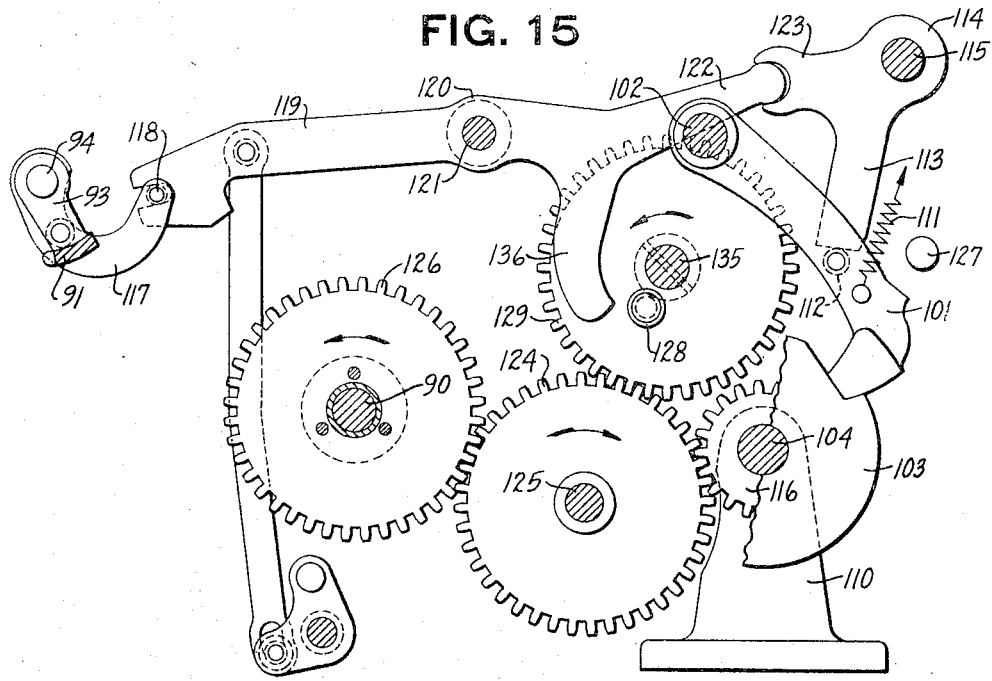

April 25, 1939.  S. BRAND  2,155,928
CASH REGISTER
Filed June 12, 1935  14 Sheets-Sheet 9
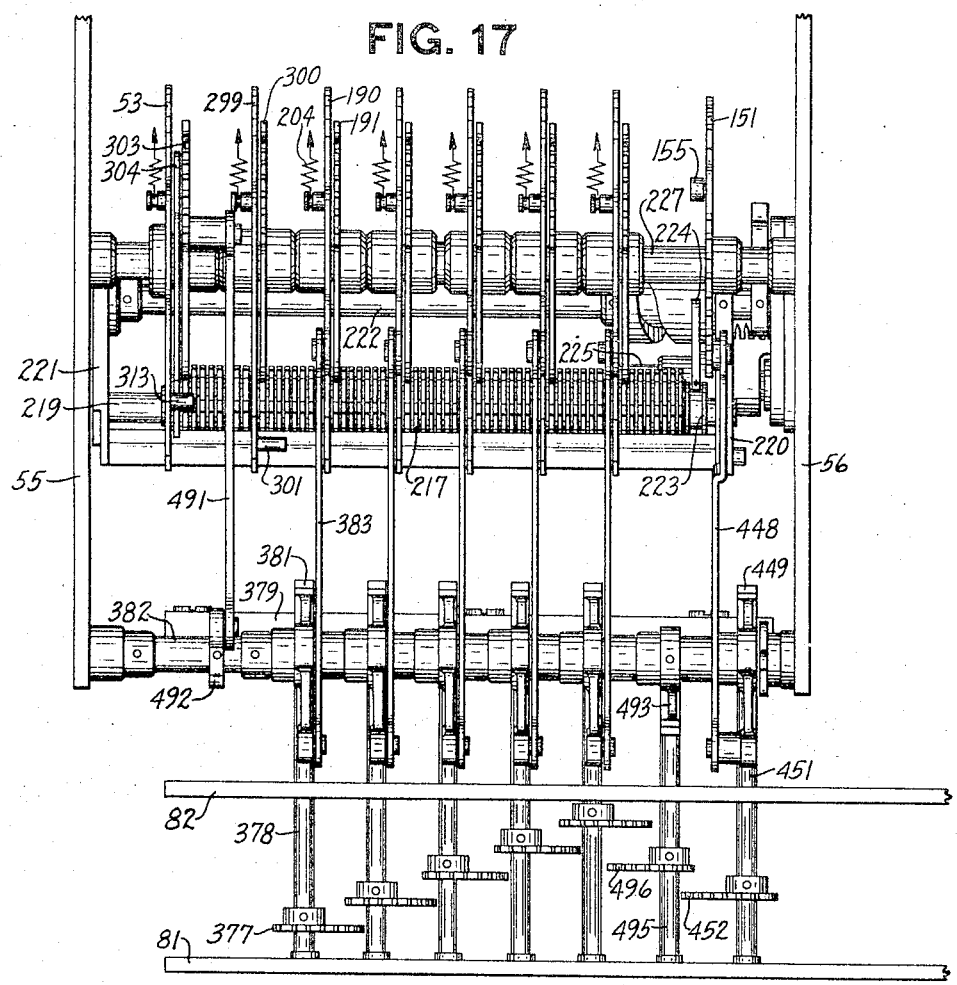
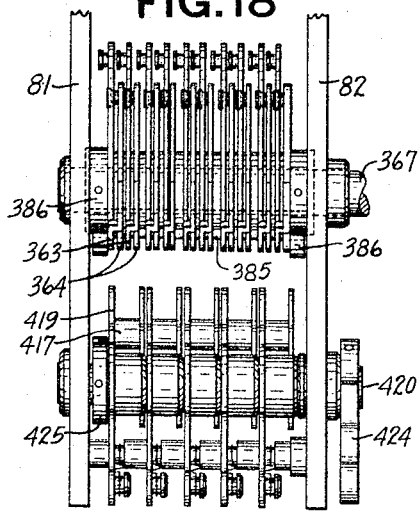
Inventor
Samuel Brand
By
Carl Benst
His Attorney April 25, 1939.  S. BRAND  2,155,928
CASH REGISTER
Filed June 12, 1935  14 Sheets-Sheet 10
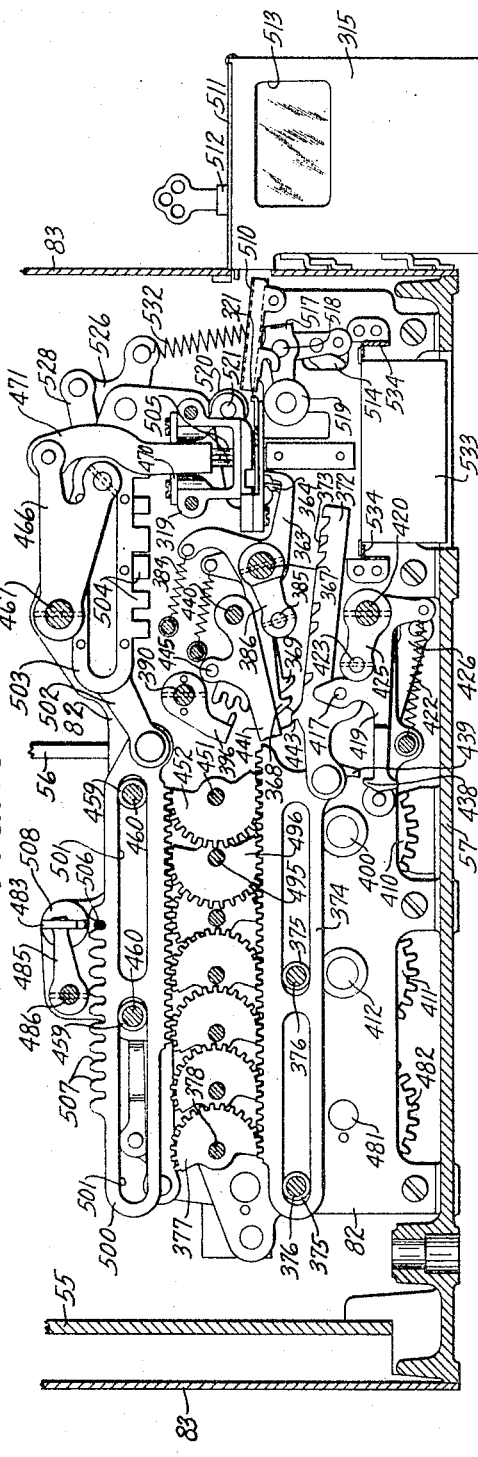
Inventor
Samuel Brand
By
Carl Beust
His Attorney

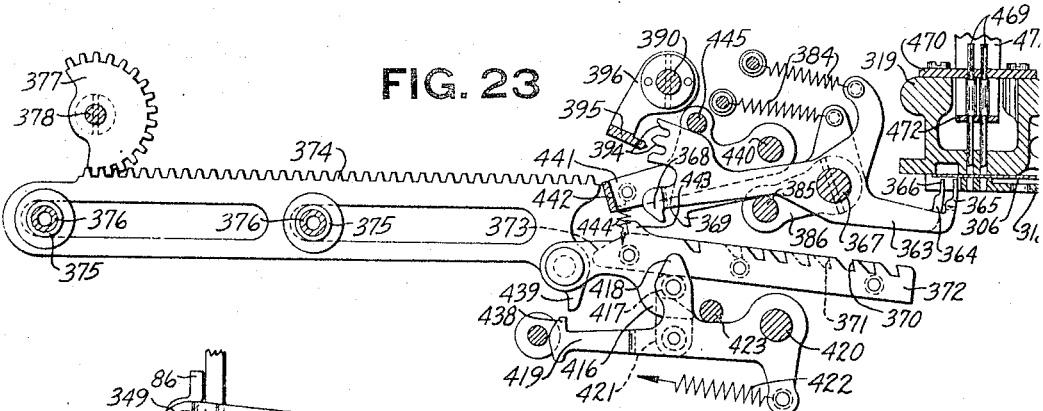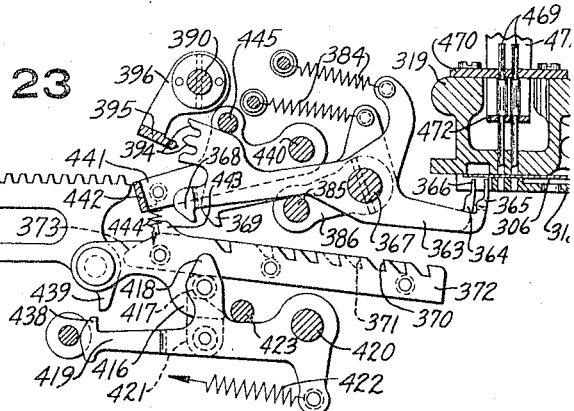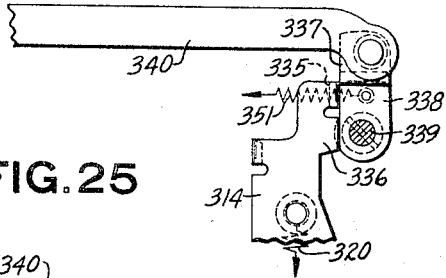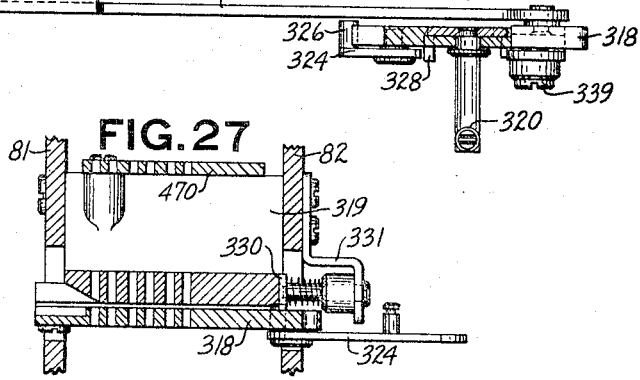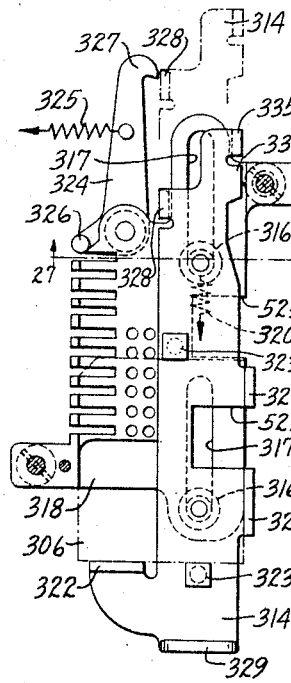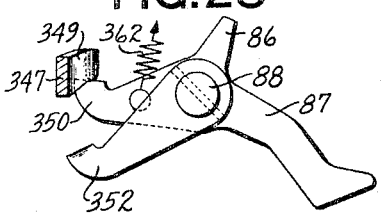

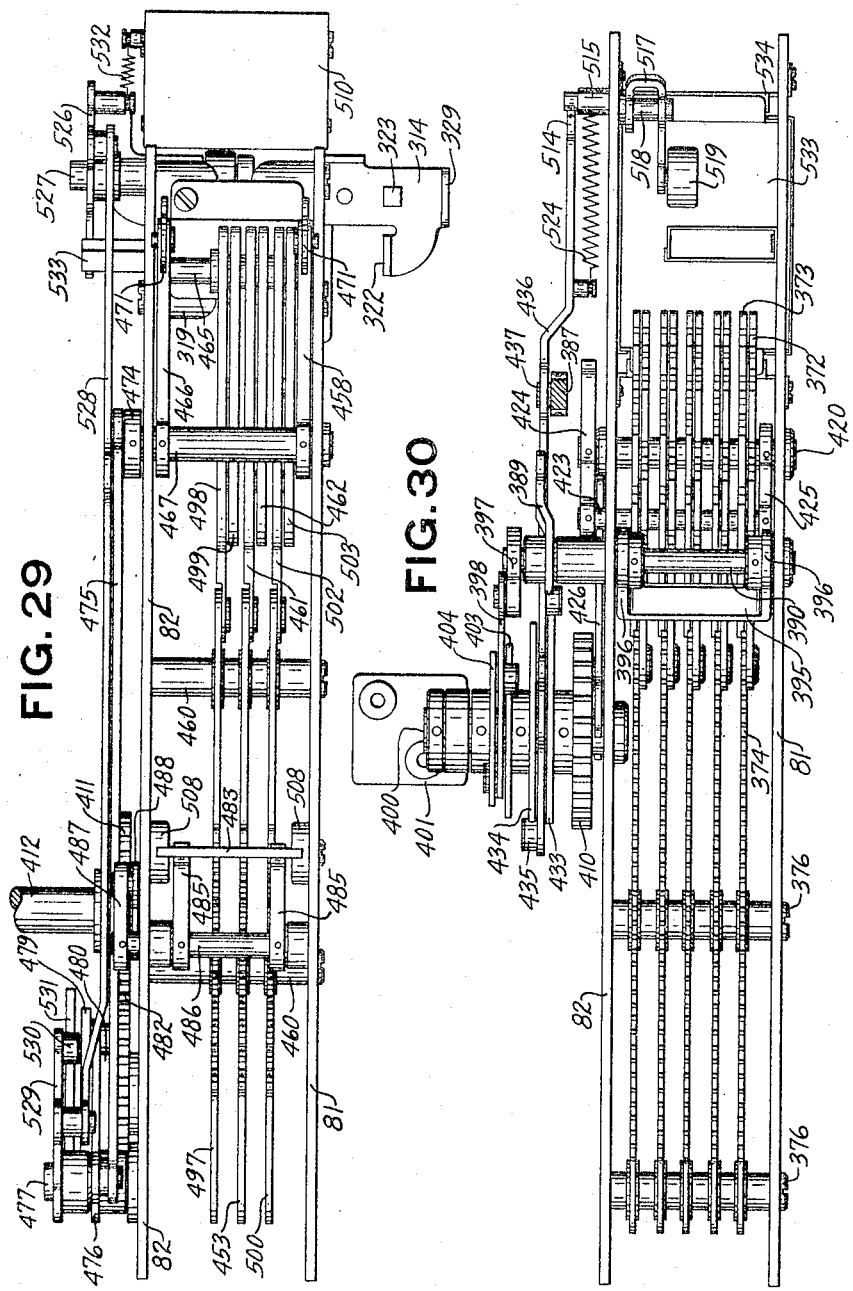

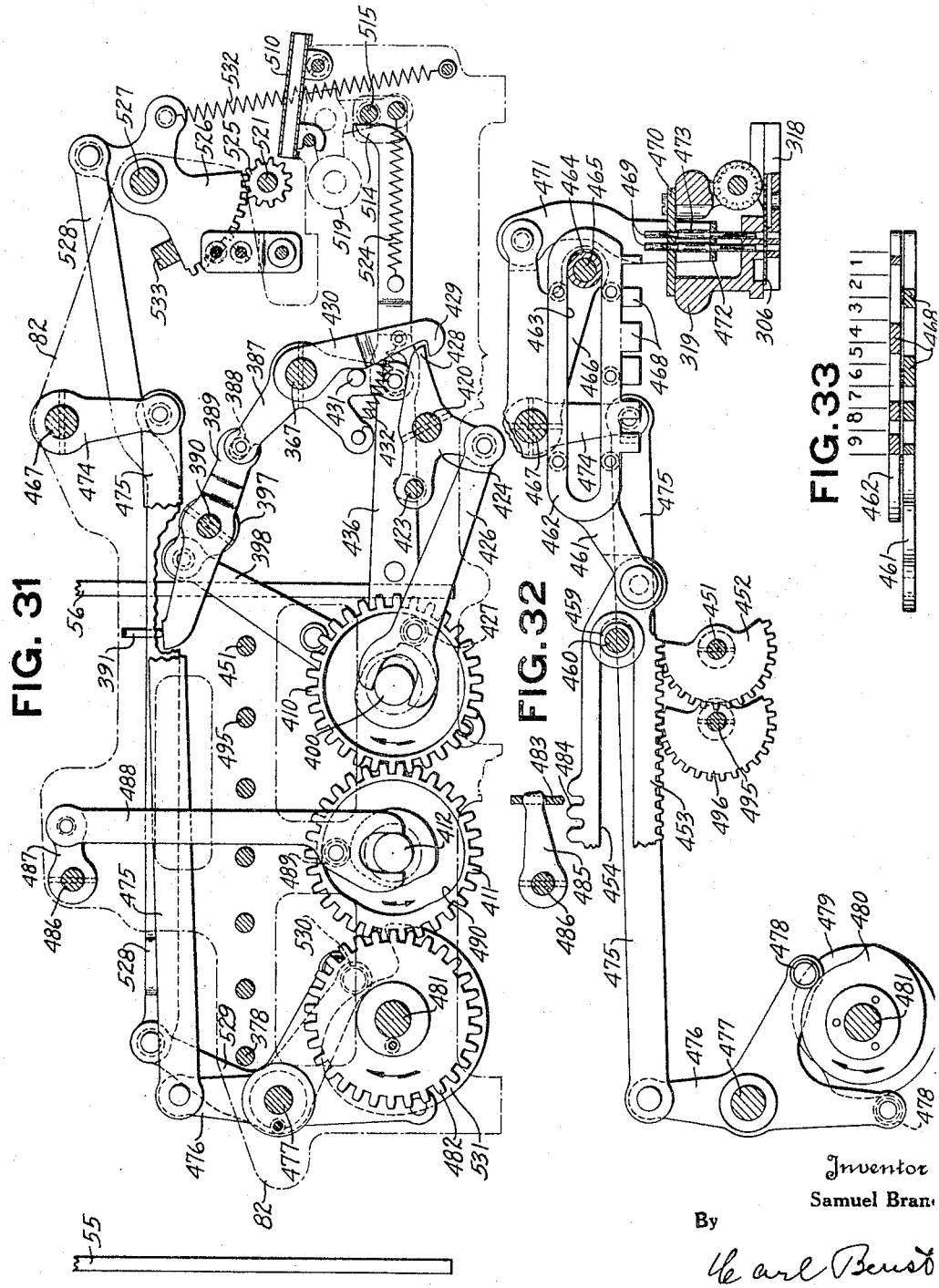

April 25, 1939.  S. BRAND  2,155,928
CASH REGISTER
Filed June 12, 1935  14 Sheets-Sheet 14
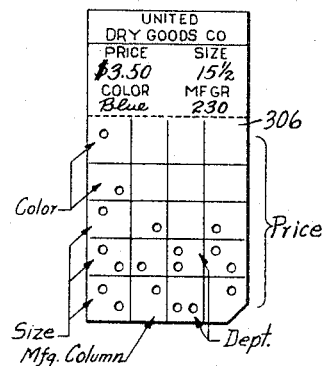
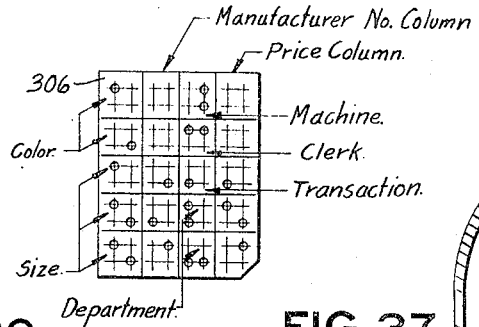
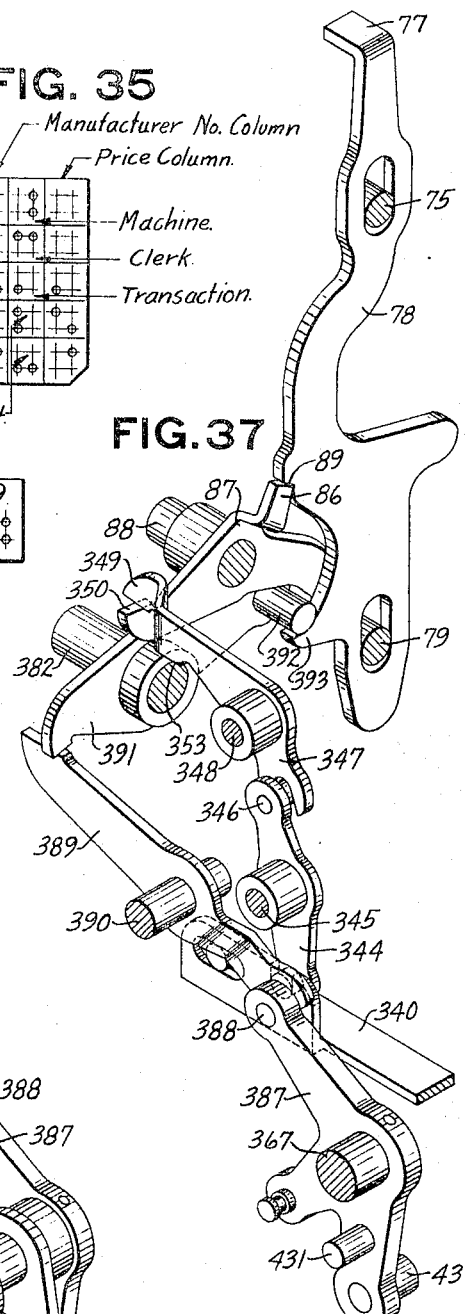
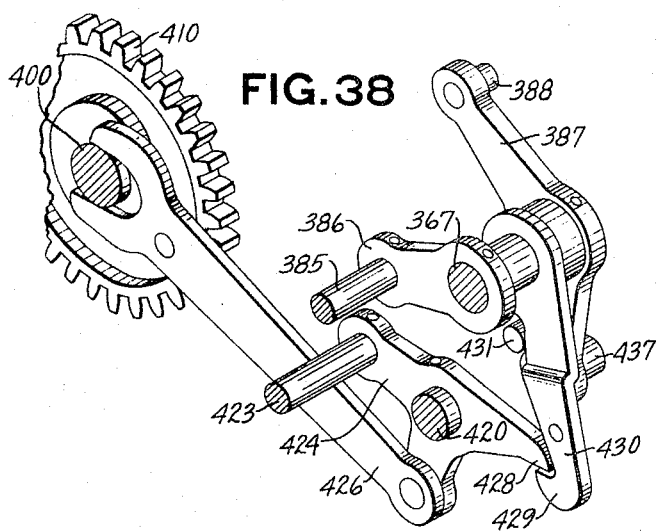
Inventor
Samuel Brand
By
Carl Beust
His Attorney Patented Apr. 25, 1939

2,155,928

UNITED STATES PATENT OFFICE 2,155,928

CASH REGISTER

Samuel Brand, Binghamton, N. Y., assignor to The National Cash Register Company, Dayton, Ohio, a corporation of Maryland Application June 12, 1935, Serial No. 26,184

10 Claims. (Cl. 235—61.6)

This invention relates to cash registers and like machines and is more particularly directed to card perforating and interpreting mechanisms as applied to machines of the type disclosed in Letters Patent of the United States No. 1,795,509 issued March 10, 1931, Patent No. 1,812,020 issued June 30, 1931, Patent No. 1,816,263 issued July 28, 1931, and Patent No. 1,924,290 issued August 29, 1933 to William H. Robertson. Also application for letters patent of the United States, serial number 419,938 (now Patent No. 2,056,485) and 423,722 (now Patent No. 2,048,200) filed respectively January 10, 1930 and January 27, 1930 by William H. Robertson.

Machines of the character disclosed in the above mentioned patents and applications are provided with a plurality of totalizers, differential mechanism and a plurality of rows of manipulative keys to control the differential mechanism to accumulate in the totalizers. Indicating and printing mechanisms are provided for obvious purposes. Such machines are quite versatile and have been successfully adapted to various lines of business, such as stores, telegraph offices, motor busses and other media of transportation, postage machines, etc.

It is the primary object of this invention to provide a novel, compact machine, capable of picking up certain data from perforated price tickets, entering said data into the machine, perforating additional data on said tickets, printing all of said data on a plurality of record materials, and depositing the tickets in a receptacle.

Another object of this invention is to provide in a machine of the type indicated novel means to automatically pick up the amount to be registered from a perforated price ticket.

Another object is to provide in a cash register or other accounting machine, novel means to pick up certain data from a perforated price ticket, to enter said data into the machine, and to perforate certain other data on said price tickets.

Another object of this invention is to provide novel means to enter certain data into the machine under the control of perforated tickets and to perforate additional data on said tickets under the control of manipulative devices.

Still another object is to provide a novel carrier for record material, for use in a machine of the type indicated.

A further object is to provide novel means to pick up amounts from the perforated field of a record card.

Another object is to furnish a novel interlock between a record material carrier and the machine releasing mechanism.

A further object of the present invention is to provide novel means to prevent the pickup mechanism from functioning when the machine is conditioned for totalizing operations.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 3 is a detail view of the bank of transaction keys, a part of the differential mechanism associated therewith and the key releasing mechanism.

Fig. 4 is a detail view of a part of the key releasing mechanism.

Fig. 5 is a detail view of the resilient means for restoring the zero stop pawl throwout shaft to normal position.

Fig. 12 is a detail view illustrating the total control lever and a part of the mechanism associated therewith.

Fig. 13 is a fragmentary detail view of the interlock between the total control lever and the clerks' keys.

Fig. 14 is a detail view of the clerk's differential and the totalizer selecting mechanism.

Fig. 15 is a detail view of the machine operating mechanism and a part of the machine releasing mechanism.

Fig. 16 is a chart illustrating in graphic form the time of operation of the important units of the machine.

Fig. 17 is a top plan view illustrating the differential and totalizer mechanisms.

Fig. 18 is an end view, as observed from the right of the machine, of a portion of the interpreting mechanism.

Fig. 19 is a sectional view as observed from the front of the machine, illustrating the price ticket perforating and analyzing mechanisms.

Fig. 20 is a diagrammatic view showing the relation between the feelers of one denominational unit and the differential bars associated therewith.

Fig. 21 is a detail view of the alining mechanism for the feelers.

Fig. 22 illustrates in detail the tension device for the price ticket ejector mechanism.

Fig. 23 is a detail view of the feeler or interpreting mechanism for one denominational unit.

Fig. 24 is a fragmentary plan view of a part of the interlocking mechanism between the price ticket carriage and the machine releasing mechanism.

Fig. 25 is a detail front view of the interlocking mechanism between the price ticket carriage and the machine releasing mechanism.

Fig. 26 is a plan view of the price ticket carriage.

Fig. 27 is a sectional view of the guide plates and die plate for the perforating punches.

Fig. 28 is a side view of a part of the mechanism shown in Fig. 25.

Fig. 29 is a top view of the perforating mechanism.

Fig. 30 is a plan view of a part of the interpreting mechanism and other mechanism associated therewith.

Fig. 31 is a front elevation of the operating mechanism for the analyzing section of the machine.

Fig. 32 is a detail view of one unit of the perforating mechanism.

Fig. 33 is a diagrammatic view of one set of perforating control plates.

Fig. 34 is a facsimile of the type of ticket used in the machine of this invention.

Fig. 35 is a facsimile of the lower section of a price ticket after it has been acted upon by the machine of this invention.

Fig. 36 is a chart giving an interpretation of the perforation system used in the instant machine.

Fig. 37 is a perspective view of a part of the releasing mechanism and interlocking mechanism associated therewith.

Fig. 38 is a perspective view of a part of the locking mechanism between the total control levers and the feeler mechanism.

General Description

Figure 1:
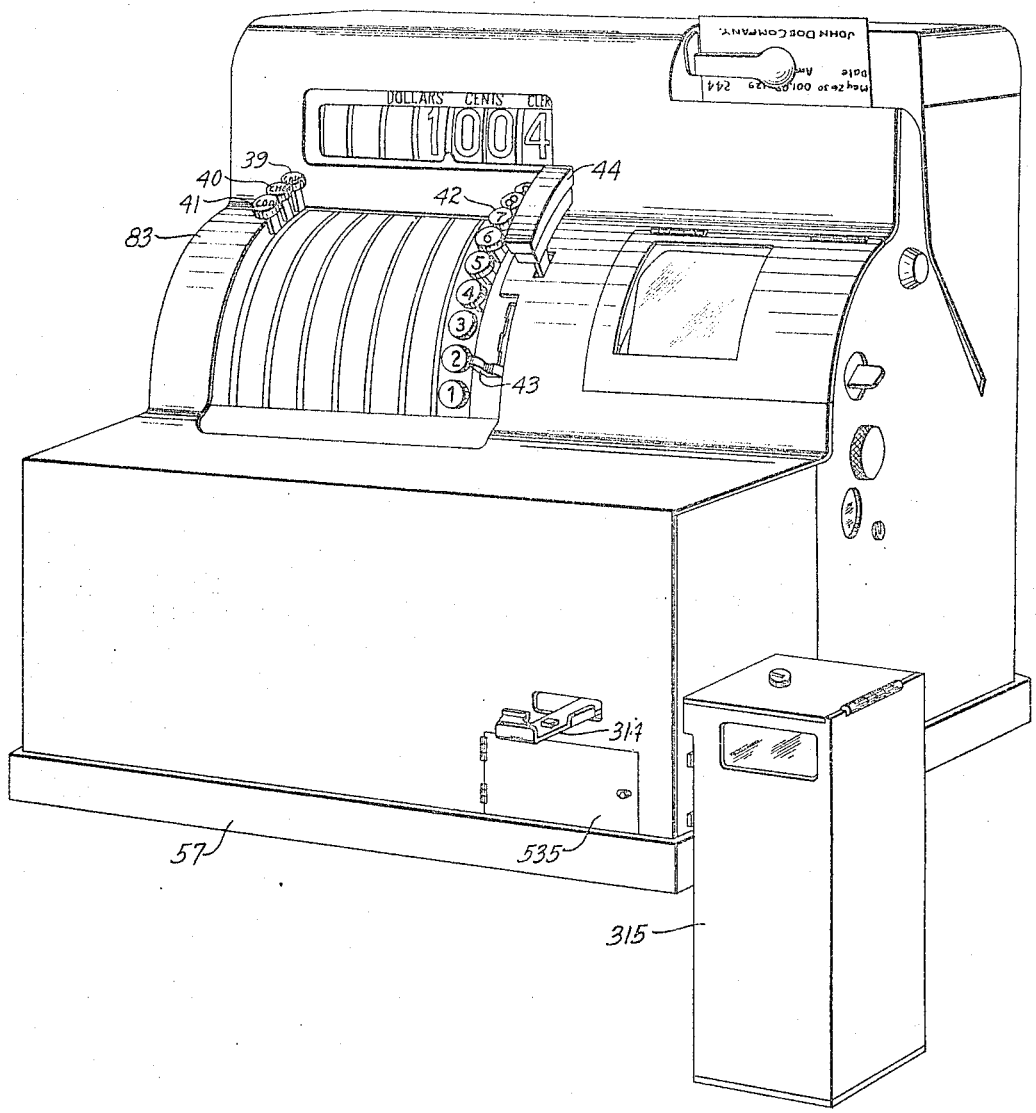
Fig. 1 is a general perspective view of the machine enclosed in its cabinet or case.

The appearance of the machine disclosed in this application is characterized by its compactness, the accessibility of controls and the absence of the customary amount keys. The customary roller type of indication is supplied and is visible from either the front or back of the machine. The present machine has a plurality of type carriers adapted to print records of the transactions upon a detail or audit strip, which is retained in the machine, and upon either an issuing receipt or upon an insertable record slip. The instant machine has a plurality of interspersed totalizers selected for engagement with their actuators by means of a row of clerks' keys located at the right of the keyboard. The clerks' keys also control the indication and printing mechanism to record the identity of the clerk completing the transaction. A row of transaction keys located at the extreme left of the keyboard causes the type of transaction to be indicated and recorded. The transaction keys are mechanically released near the end of machine operations, or may be manually released when desired by means of the usual release lever. The clerks' keys are stay-down keys in that they are not mechanically released near the end of machine operation, neither may they be manually released with the obvious result that there is always a clerks' key depressed.

Conveniently located to the right of the clerks' keys is a total control lever that conditions the totalizers for add, read, or reset operations. Also to the right of the clerks' keys is the usual machine release bar. Incorporated in the machine of this invention is the usual differential mechanism to add amounts in the totalizers, or to read or reset the totalizers. The differential mechanism also controls the indicating and printing mechanisms to indicate and record the amount of the transaction.

As previously stated, the present machine has no amount keys, but the setting of the amount differentials is controlled by means of a perforated price ticket which is detached from the article purchased at the time of the sale and placed in a carriage conveniently located at the front of the machine. With the total control lever in add position the machine is locked until the carriage is moved into operating position, in which position said carriage is locked until near the end of the machine operation. One end of the ticket is beveled and it is impossible to move the carriage into operating position unless this bevel is properly positioned in relation to the carriage, thus enforcing proper insertion of the ticket. It might be well to state here that the clerks' keys are control keys in that it is impossible to release the machine for operation unless one of these keys is depressed.

After the ticket is properly inserted in the machine, the carriage moved to operating position, a transaction key and a clerk's key depressed, releasing the machine for operation causes the sale price to be picked up from the ticket and added into the proper clerk's totalizer. In addition, perforating mechanism is provided to punch additional data in the ticket at the time the price is being interpreted. Two units of the perforating mechanism, which are controlled respectively by the transaction keys and the clerks' keys, cause the code of a number symbolic of the type of transaction performed to be punched in the proper field of the ticket, and the code of the number of the clerk operating the register to likewise be punched in the ticket. A pre-set and fixed unit of the perforating mechanism simultaneously perforates the code of the number of the register in the ticket. Near the end of the machine operation the price ticket is ejected from the carriage and deposited in a suitable receptacle located on the righthand side of the machine after which the carriage is automatically returned outwardly to normal position.

The mechanism briefly outlined above will now be described in detail.

DETAILED DESCRIPTION

Frame work

The main body of the machine is supported between a left side frame 55 (Figs. 2, 9 and 17), and a right side frame 56 secured to a base 57 and rigidly connected by a cross frame 58 and by a tie bar 59. Indicator frames 80 (only one here shown in Fig. 2) are secured to the frames 55 and 56 to support the indicator mechanism.

The pickup or feeler mechanism and the perforating mechanism are supported between a front cross frame 81 and a back cross frame 82, both of which are secured to the base 57. A cabinet or casing 83 (see also Fig. 1) encloses the entire machine except the manipulative control elements which project through suitable openings therein. The cabinet is secured to the base 57 at spaced intervals.

Keyboard

As previously brought out, there are no amount keys provided to control the registering of amounts in the present machine, which machine is adapted to be used for instance in a department store where each article sold has attached thereto a pre-punched price ticket. These tickets are detached when the articles are sold and are then inserted in the machine. Operation of the machine picks up the amount of the purchase and enters it into the proper clerk's totalizer, as will be more fully brought out later in the specification.

The keyboard of the present machine includes a bank containing three transaction keys, 39, 40 and 41 (Figs. 1 and 3). This bank is located at the left side of the keyboard. The key 39 is used to enter cash sales and is marked "Cash." The key 40 is used to enter charge sales and is marked "Charge." The key 41 is for the purpose of registering cash-on-delivery sales; hence it is labeled C. O. D. It will be noted that the customary "Received-on-account" and "Paid-out" keys are omitted from the present machine, as this machine is intended to be used for the registering of sales only. In case it is desirable, it is merely a matter of assembly to add other transaction keys in the transaction bank.

Located near the right side of the keyboard is a bank of clerks' keys 42 (Figs. 1 and 2) numbered from 1 to 9 inclusive. These keys as will be brought out later, are used to select totalizers and to control the setting of indicators and type carriers. Immediately to the right of the clerks' bank is located a total control lever 43 (Figs. 1 and 11) the purpose of which is to control the machine to make total and sub-total operations.

A motor release bar 44 protrudes through an opening in the cabinet to the right of the clerks' keys and above the total control lever 43. Depression of the release bar after other conditions have been fulfilled, releases the machine for operation.

Transaction keys

The transaction keys 39, 40 and 41 (Fig. 3) exercise no control over the machine other than to control the differential setting of the indicators and the type carriers. These keys are slidably mounted in a key frame 45, removably mounted on cross rods 46 and 47 supported in the frames 55 and 56. Each of the keys 39, 40 and 41 carries a key pin 48, which cooperates with the beveled edges of projections 49 of a detent bar 50, slidably supported by studs 51 in the key frame 45. Depression of any one of the keys 39, 40 or 41, causes the key pin 48 to shift the bar 50 downwardly until said pin 48 has passed a shoulder on the projection 49, whereupon a spring 52 restores the detent bar upwardly part-way, hooking the shouldered projection 49 over the pin 48 to retain the key depressed.

A differential unit including a segment 53 to be described later, is operated under the control of the transaction keys and a zero stop arm 54 pivotally supported on the key frame 45. When there is no key 39, 40 or 41 depressed, the differential segment 53 is arrested in its zero position by the stop arm 54. Depression of one of the transaction keys, however, rocks the stop arm 54 clockwise to its ineffective position. This is accomplished in the following manner: Downward movement of the detent 50, caused by depressing one of the transaction keys, causes a stud 60 carried by said detent, in cooperation with a projection on the arm 54 to rock said arm clockwise against the tension of a spring 61, out of the path of the differential unit. The differential unit is now free to travel upwardly until such movement is arrested by said unit striking the lower end of the depressed transaction key 39, 40 or 41.

During operation of the machine it is desirable to prevent manipulation of the transaction keys. This is accomplished by shifting a locking detent 62 upwardly to engage hooks 63 thereon with the key pins 48, the hooks 63 passing under the pins 48 of the undepressed keys, thus locking said keys against depression. The particular hook 63 opposite the pin 48 of the depressed transaction key hooks over said pin, thus locking said key depressed. The bar 62 is slidably mounted on the studs 51 and is actuated by means to be disclosed later. Near the end of each operation the bar 62 is lowered by a spring (not shown) thereby permitting release of the depressed key and permitting depression of other transaction keys.

Clerks' keys

The clerks' keys 42 (Figs. 1, 2 and 13) are slidably mounted in a key frame 64 supported on rods 46 and 47. Each of the keys 42 carries a pin 65 adapted to cooperate with projections 66 and 67 on a detent bar 68 and a control bar 69, respectively. These bars are mounted similar to the bars 50 and 62 (Fig. 3) for the transaction bank. Depressing one of the keys 42 engages the pin 65 with the beveled edge of the projection 66 of the bar 68 and forces this bar downwardly until the pin 65 has passed the shoulder on the projection, whereupon a spring 70 (Fig. 2) returns the bar upwardly a slight distance to lock the projection over the stud 65, thus holding the key in depressed position. The depressed clerks' key 42 remains depressed until another key in the same bank is depressed. The clerks' keys may not otherwise be released. The key pin 65 upon depression of a clerk's key also engages the projection 67 on the control bar 69 and forces this bar downwardly for the purpose of unlocking the machine releasing mechanism in a manner presently to be disclosed.

Machine releasing mechanism

Figures 10, 11:
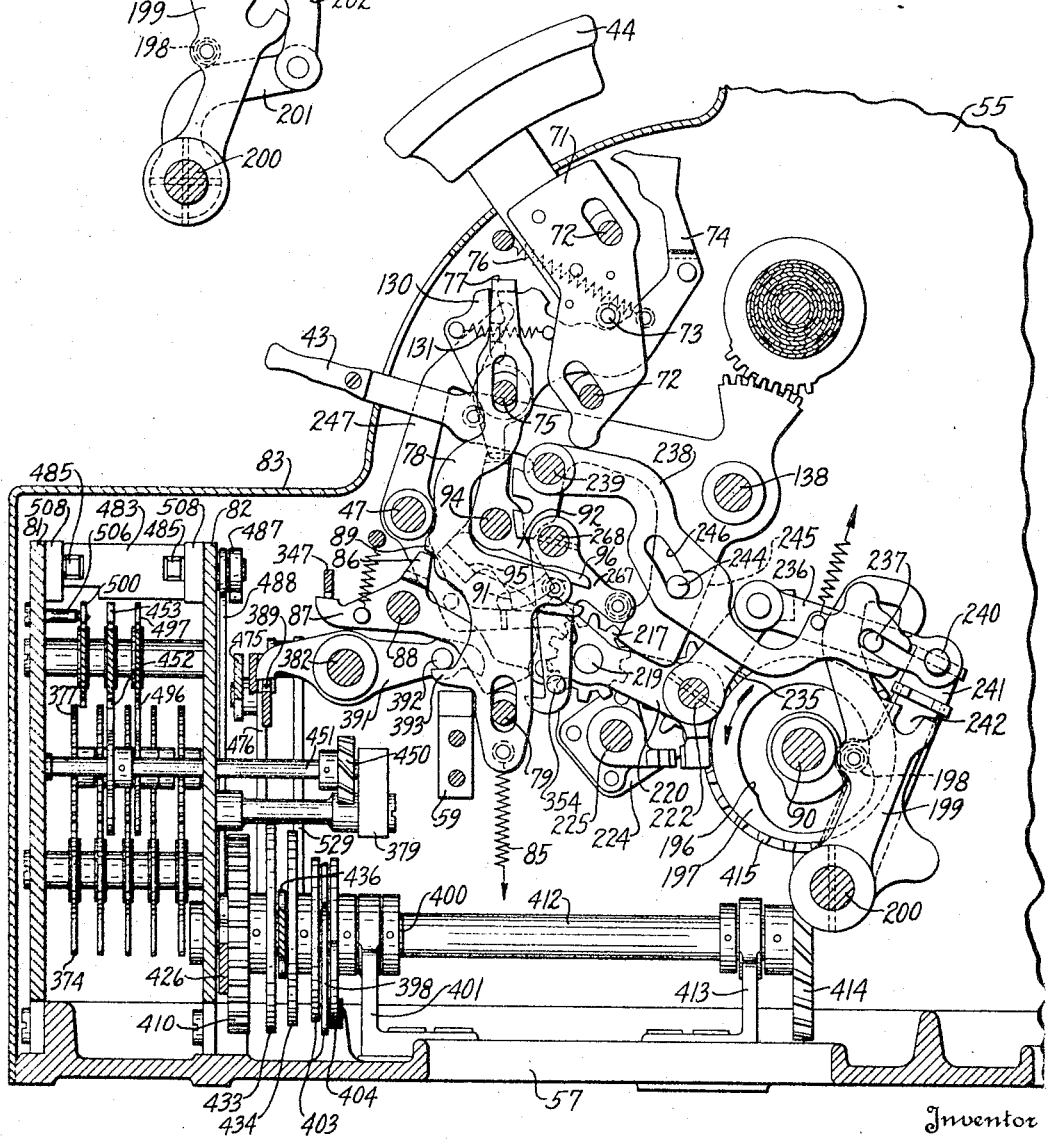
Fig. 10 is a fragmentary detail view of a part of the mechanism to operate the coupling pinions.
Fig. 11 is a sectional view of the machine as observed from the right, and illustrates the total control mechanism, the totalizer engaging mechanism, and the machine releasing mechanism.

When a transaction key 39, 40 or 41 and a clerk's key 42 have been depressed, the machine may be released for operation by depressing the motor release bar 44 (Figs. 1 and 11). The bar 44 is removably mounted on a plate 71, slidably mounted on two studs 72 projecting inwardly from the frame 56. A stud 73 on the plate 71 projects across the plane of an arm 74 pivoted on a stud 75 in the frame 56, and said arm is held in contact with the stud 73 by a spring 76. Depression of the release bar 44, due to the stud 73, rocks the arm 74 clockwise, removing a shoulder thereon from beneath an ear 77 on the upper end of a vertically disposed bar 78, slidably mounted on the stud 75 and on a stud 79 in the frame 56, whereupon a spring 85 quickly lowers the bar 78. However, before the bar 78 may be lowered it is necessary to remove a projection 86 on a lever 87 pivoted on a shaft 88 supported by the frames 55 and 56, from the path of a shoulder 89 on the bar 78. This, as will be fully disclosed later, is accomplished by movement of the ticket carrier into its inner position.

After the shoulder on the arm 74 (Fig. 11) is removed from the path of the bar 77 and the projection 86 is removed from the path of the shoulder 89, the downward movement of the bar 78 occasioned by the spring 85 actuates mechanism (Figs. 2, 3, 9, 11, 12 and 15) to couple the driving motor (not shown) to a main drive shaft 90 and to close an electric switch whereby the motor is energized to operate the drive shaft 90 one counterclockwise rotation at each operation of the machine. This mechanism includes a bail 91 carried by arms 92 and 93, rotatably mounted on studs 94, one projecting inwardly from each of the frames 55 and 56. The arm 92 (Figs. 11 and 12) is connected by a yoke 95 to an arm 96 having its end bifurcated to embrace a stud 97 projecting from the bar 78.

Obviously, downward movement of the bar 78, due to the stud 97, rocks the arms 96, 92 and 93 clockwise, carrying the bail 91 therewith. Means is provided, however, to enforce depression of a clerk's key 42 before the bail 91 may be so rocked. This means includes an arm 98 (Fig. 13) pivoted on the shaft 88 and having its free end normally blocking movement of the bail 91. The arm 98 is slotted to receive a stud (not shown) on the lower end of the control bar 69. Depression of a clerk's key 42, as set forth above, lowers the bar 69, thus rocking the arm 98 clockwise to remove the end thereof from the path of the bail 91. Complete depression of the key 42 is enforced due to an arm 99, also pivoted on the shaft 88, and being slotted to embrace a stud 100 in the lower end of the detent bar 68. The free end of this arm 99 normally rests above the path of the bail 91 and partial depression of a key 42 by lowering the detent bar 68 rocks the arm 99 into the path of said bail. It will be recalled that when the key 42 is fully depressed the detent bar 68 is raised to engage the hook 66 with the pin 65 of the depressed key. This upward movement of the detent bar 68 rocks the arm 99 counterclockwise, out of the path of the bail 91, which is now free to rock clockwise to release the machine for operation.

The machine is normally restrained against idle operation by a clutch stop arm 101 (Fig. 15) pivoted on a shaft 102 supported by the frames 55 and 56 which arm 101 cooperates with a clutch control disk 103 mounted on a stud 104 supported by two brackets 110, only one of which is here shown, on the base of the machine. The clutch arm 101 is normally held in restraining relationship with the clutch disk 103 against the tension of a spring 111 by a stud 112, on the arm 101, resting against the end of an arm 113 of a bell crank 114 pivoted on a shaft 115 supported between the frames 55 and 56. Upon depression of the motor bar 44 the bell crank 114 is rocked clockwise freeing the arm 101 to the tension of the spring 111, which spring immediately rocks the arm 101 counterclockwise out of restraining relationship with the clutch disk 103, and a spring actuated clutch operating device (not shown) renders the clutch effective to couple an electric motor (not shown) of conventional design to a gear 116 rotatably mounted on the stud 104, and closes an electric switch, thus energizing the motor. The mechanism for rocking the arm 101 upon depression of the motor bar 44 will now be described.

A curved arm 117 (Fig. 15) mounted on the stud 94 and secured to the arm 93 of the bail 91 carries a stud 118 embraced by a slot in the end of one arm 119 of a lever 120 mounted on a stud 121 in the frame 55. The rounded end of the other arm 122 of the lever 120 is embraced by the bifurcated end of an arm 123 of the bell crank 114. When the motor release bar 44 (Fig. 11) is depressed, permitting the spring 85 to move the bar 78 downwardly, rocking the bail 91 clockwise, as described above, the curved arm 117 (Fig. 15) is rocked clockwise therewith. This movement rocks the lever 120 counterclockwise and by the coupling between the arms 122 and 123 rocks the bell crank 114 clockwise to remove the end of the arm 113 from the path of the stud 112 whereupon the spring 111 rocks the stop arm 101 counterclockwise, freeing the clutch control disk 103 to the action of a spring (not shown) which immediately effects a coupling between the motor (not shown) and the gear 116.

The gear 116 meshes with an intermediate gear 124 rotatably mounted on a stud 125 in the frame 55, and the gear 124 meshes with a gear 126 secured on the drive shaft 90. Counterclockwise rotation of the gear 116 rotates the gear 124 clockwise and the gear 126 counterclockwise, thus rotating the drive shaft 90 counter clockwise one rotation at each operation of the machine.

When the arm 113 frees the stud 112 the spring 111 rocks the arm 101 counterclockwise until said arm is arrested by a stop stud 127 in the frame 55, in which position of the arm 101 the stud 112 rests opposite the beveled lower righthand corner, as viewed in Fig. 15, of the arm 113.

Near the end of an operation a roller 128, carried by a gear 129 fast on a short shaft 135 journaled in the frame 55, engages and wipes by a downwardly extending curved projection 136 on the arm 122 of the lever 120. As the roller 128 wipes by the projection 136 it rocks the lever 120 clockwise, rocking the bell crank 114 counterclockwise to normal position. This movement of the arm 113 by means of the stud 112, cams the clutch stop arm 101 clockwise to normal position stopping the clutch control disk 103 thus uncoupling the motor from the gear 116 and opening the electric switch to stop the motor. The clockwise movement of the lever 120 also rocks the arm 117 and the bail 91 counterclockwise (Fig. 15) and the arm 96 (Fig. 11) raises the bar 78 until the ear 77 clears the shoulder of the arm 74, which arm is immediately rocked counterclockwise by the spring 76, again positioning the shoulder on the arm 74 beneath the ear 77 to restrain the release bar 78 against downward movement until it is again desired to operate the machine. Counterclockwise movement of the arm 74 also restores the motor release bar to its undepressed position.

In case the motor bar 44 (Fig. 11) is inadvertently retained depressed at the end of the machine operation a non-repeat pawl 130 urged by a spring 131 passes under the ear 77 when the bar 78 is returned upwardly, thus preventing a repeat operation of the machine. The spring 131 which is stretched between the pawl 130 and the arm 74 normally maintains an ear of said pawl in contact with a raised surface on said arm 74. The pawl 130 extends a little above the portion of the arm 74 that cooperates with the ear 77, therefore when the motor bar is released the spring 76 restores the arm 74 counterclockwise, which in turn disengages the pawl 130 from the ear 77.

Differential mechanisms

The differential mechanisms associated with the banks of amount and transaction keys are substantially the same as the amount differentials disclosed in the patents to Robertson, cited in the beginning of this specification. The clerk's key differential mechanism differs somewhat from the differentials associated with the amount banks, the clerk's differential being structurally similar to the transaction differential disclosed in the U. S. application, Serial Number 423,722, filed by Robertson January 27, 1930, Patent No. 2,048,200, issued on July 21, 1936.

Clerk's differential

The bank of clerks' keys 42 (Figs. 2 and 14) is provided with a differential mechanism including a differentially movable arm 137 journaled on a rock shaft 138 supported between the frames 55 and 56. Depression of one of the clerk's keys 42 interposes its lower end in the path of a latch arm 139 projecting forwardly from a latch 140 pivotally supported on the differential arm 137. A spring 141 normally holds the latch 140 in the position in which it appears in Fig. 14, with a tail 142 of said latch resting against a stop stud 143 in the differential arm 137. In this position of the latch 140, an ear 144, bent at right angles thereto, extends across the path of an arcuate flange 145 on a differential actuator 146 fast on the rock shaft 138. The rock shaft 138, as will be described later, is rocked an invariable extent of travel first clockwise and then back to normal position at each operation of the machine.

When the actuator 146 travels clockwise, the flange 145 causes the latch 140 and consequently the differential arm 137 to travel therewith until the latch arm 139 strikes the lower end of the depressed key, whereupon continued travel of the actuator 146 rocks the latch 140 counterclockwise about its pivot on the differential arm 137, disengaging the ear 144 from the flange 145 and engaging said ear with the proper one of a series of notches 147 in the arcuate forward end of a tie bar 148 supported on the rock shaft 138 and having its rear end bifurcated to embrace a collar on a coupling pinion shaft 149 supported in the frames 55 and 56. When the ear 144, as it enters a particular notch 147, clears the flange 145 the inner periphery of said flange, as the actuator 146 continues its clockwise travel, wipes along the left edge of the ear 144, thus locking said ear, between the flange 145 and the particular notch 147, against the tension of its restoring spring 141. This locks the differential arm 137 in the position corresponding to the depressed clerk's key 42.

The differential arm 137 is thus differentially positioned according to the particular clerk's key 42 depressed. On the return travel of the actuator 146, a stud 150 projecting laterally from the actuator 146 picks up the differential arm 137 and restores said arm to its home position. As the flange 145 on the return movement of the actuator 146 clears the ear 144 the spring 141 rocks the latch 140 clockwise to normal position, disengaging said ear 144 from the notch 147, the clockwise movement of the latch 140, being arrested by the stop stud 143.

The movement of the differential arm 137 is utilized to select totalizers and to set type carriers and indicators. To this end the movement of the differential arm 137 is transmitted to a gear segment 151 (Figs. 2 and 14) journaled on the rock shaft 138, by a minimum movement beam 152 having one of its ends pivoted at 153 to the differential arm 137. A U-shaped block 154 secured to the opposite end of the beam 152 forms an open slot which embraces a stud 155 projecting laterally from the segment 151. Obviously when the differential arm 137 is set according to the depressed key 42 the pivot point 153 of the beam 152 is set to a corresponding position. A drive arm 160 pivoted on the shaft 149 is then operated to bring an anti-friction roller 161 carried thereon into contact with the lower edge of the beam 152 to force the curved inner edge of the said beam into contact with a collar (not shown) on the rock shaft 138. As the beam 152 is thus moved the segment 151, due to the couplings 154 and 155, is rotated from the position in which it was left at the last operation directly to its new position as determined by the setting of the differential arm 137. The drive arm 160 then is returned to its normal position.

The mechanism for operating the drive arm 160 includes a pair of cam plates 162 (Fig. 2) secured on the drive shaft 90, which cam plates cooperate with two rollers 163 carried by a cam lever 164 pivoted on a shaft 156 supported in the frames 55 and 56. A roller 165 on the upper end of the lever 164 enters a slot 166 in the drive arm 160. At the proper time during the operation of the machine the cams 162 rock the lever 164 counterclockwise to rock the drive arm 160 clockwise. Shortly thereafter the lever 164 and the drive arm 160 are returned to their respective normal positions by the cams 162.

It was stated above that the setting of the segment 151 is transmitted to a printing mechanism whereby certain characters may be printed on suitable record material. This is accomplished in the usual manner as follows: Teeth 167 (Fig. 2) on the segment 151, mesh with a gear 168 secured to a particular one of a group of nested tubes 169 surrounding a shaft 170. These tubes extend into a printing mechanism located generally at the right of the machine (see Fig. 1) to set the printing elements. Any suitable printing mechanism may be used in connection with the herein disclosed machine, none being therefore illustrated. It is possible, however, to employ printing mechanism such as disclosed in the Patent No. 1,795,509 issued to Robertson, which printing mechanism is particularly adapted for use with machines of the type herein shown. For a full and complete understanding of the printing mechanism reference may be had to the above mentioned Robertson patent.

The clerk's differential mechanism, through the medium of the gear segment 151 also sets indicators 171 and 172 (Fig. 2) to display characters symbolic of the clerk's identity through apertures in the front and rear of the cabinet 33. The indicators 171 and 172 are rotatably mounted respectively on indicator shafts 173 and 174 supported by two indicator frames 80 (Fig. 2) only one of which is here shown. The indicator mechanism chosen for illustrative purpose in connection with the machine of the present invention is similar in structure and operation to the indicator mechanism disclosed in the Robertson Patent No. 1,812,020 previously cited in this specification; therefore only a brief description thereof will be included herein.

The gear 168 (Fig. 2) meshes with a segmental gear 176 rotatably mounted on a shaft 177 supported by the indicator frames 80, which segmental gear 176 also meshes with an indicator pinion 178 loose on the indicator shaft 173. The pinion 178 is secured to the hub of the indicator 171. Obviously the differential setting of the segment 151 is transmitted by the train of gearing 168, 176 and 178 to the indicator 171 rotating said indicator to an extent of movement commensurate with the setting of the segment 151. To set the rear indicator 172, the segmental gear 176 meshes with an intermediate gear 179 loose on a shaft 185 supported by the indicator frames 80, which gear 179 also meshes with a segmental gear 186 loosely mounted on a shaft 187 also supported by the frames 80. The segment gear 186 meshes with an indicator pinion 188 secured to the indicator 172. It can be seen that the segment 151 through the train of gearing 168, 176, 179, 186 and 188, sets the indicator 172 to a position corresponding to the setting of the clerks' differential mechanism.

In addition to setting type carriers and indicators the clerks' differential selects totalizers and positions one unit of the perforating mechanism to perforate the clerk's number in the price ticket. The mechanisms for accomplishing the above results will be described in detail later in this specification.

*Amount differentials*

For the purpose of entering amounts into the selected totalizer, an amount differential mechanism is provided for each denominational unit. These differentials are substantially the same as the amount differentials disclosed in the Robertson Patent No. 1,812,020 and No. 2,048,200 mentioned above. Since all of said differentials are substantially alike, it is thought that a description of one denominational unit will be sufficient.

Each amount differential unit includes a totalizer actuator segment 190 (Fig. 9) and an indicator and type wheel setting segment 191. The segments 190 and 191 are mounted adjacent each other on the rock shaft 138 and are normally coupled together by a broad coupling pinion 192 mounted on a rod 193 carried by a plurality of arms 194 fast on a shaft 195. The shaft 195 is journaled in the frames 55 and 56 and is adapted to be rocked at the proper time to disengage the pinions 192 from the segments 190 and 191. This is accomplished by the following mechanism.

A cam groove 196 (Fig. 11) in a totalizer engaging cam 197 fast on the drive shaft 90 embraces a roller 198 on a totalizer engaging lever 199 fast on a shaft 200 journaled in the frames 55 and 56. The shaft 200 has secured thereto an arm 201 (Fig. 10) connected by a link 202 to an arm 203, secured to the shaft 195. At the beginning of an operation the cam groove 196 rocks the lever 199, the shaft 200 and the arm 201 clockwise whereupon the link 202 rocks the arm 203, the shaft 195, and the arms 194 counterclockwise to disengage the coupling pinions 192 from the segments 190 and 191.

In previous machines of this type the amount differential segments were set under the control of depressible amount keys. As was mentioned above, however, there are no amount keys provided in the machine of this invention. In their stead mechanism, later to be described, is provided for controlling the actuator segments 190 by means of a perforated price ticket.

After the pinions 192 are disengaged from their respective segments 190 and 191 the segment 190 is differentially adjusted in a clockwise direction by a spring 204 (Fig. 9) one end of which is attached thereto. The segment 190, however, is controlled in its clockwise movement by a universal rod 210 carried by arms 211, only one here shown, which rod 210 normally retains the segment 190 against clockwise movement under the influence of the spring 204. The rod 210 is operated at the proper time during the operation of the machine by companion plate cams 212 (Fig. 6) fast on the drive shaft 90. The cams 212 rock a bell crank 213 mounted on a stud 214 in the left frame 55 first counterclockwise and then clockwise to normal position. Teeth 215 in one arm of the bell crank 213 mesh with teeth on a disk 216 secured to the arm 211 fast on the rock shaft 138. The movement of the bell crank 213 rocks the disk 216, arm 211, and the shaft 138, first clockwise, carrying the rod 210 therewith, and then counterclockwise to normal position. As the universal rod 210 travels clockwise the totalizer actuator segment 190 advances therewith under the influence of the spring 204 until the perforated ticket control mechanism functions to arrest the movement of the segment 190 at a position corresponding to the interpretation of the perforations in the ticket. The universal rod, however, continues its clockwise travel to complete its excursion of an invariable extent of travel.

The broad coupling pinion 192 was disengaged from the segments 190 and 191 (Fig. 9) before the segment 190 commenced its clockwise travel; consequently the segment 191 is left standing temporarily at the position to which it was adjusted at the previous operation. The rod 210 in its clockwise travel picks up the differentially adjusted segment 191 and restores it to its home position at the limit of its clockwise travel. After the segment 191 has been restored to its home position by the rod 210, and the segment 190 has been set differentially by the spring 204 under the control of the perforated ticket, the broad coupling pinion 192 is carried into mesh with its respective segments 190 and 191 to again couple these segments. When the cams 212 (Fig. 6) rock the rod 210 counterclockwise to its home position, said rod restores the displaced segment 190 to its normal position, said segment 190 through the coupling pinion 192 rocks the corresponding segment 191 a like distance. This differentially adjusts the segment 191 to a position corresponding to the differential setting of the segment 190.

The segment 191 (Fig. 9) is connected by a gear 205 to one of the tubes 169 which is connected to the amount type carrier for that particular denomination. The gear 205 meshes with a segment 206 loose on the shaft 177, which in turn meshes with a pinion 207 secured to an amount indicator 208 loose on the shaft 173.

The segment 206 is connected by a gear and a segment like the gear 179 and segment 166 (Fig. 2), to a rear amount indicator similar to the clerk's indicator 172. Through the above connections the differential positioning of the segment 191 is transmitted to the amount type carriers and the indicators for that particular denomination.

Totalizers

The totalizers included in the machine of the present invention are of substantially the same construction as the totalizers disclosed in the Robertson Patent Nos. 2,048,200 and 2,056,485, mentioned above, for which reason only a brief description of said totalizers and the selecting mechanisms therefor will be included in this application.

Referring to Figs. 2, 6, 9, 11, 14 and 17, a plurality of interspersed totalizer wheels 217 are mounted on a tube 218, which is slidable longitudinally on a shaft 219 supported in a pair of frames 220 and 221. These frames are fast on a shaft 222 journaled in the frames 55 and 56. The tube 218 including the totalizer wheels 217 are moved longitudinally upon the shaft 219 for the purpose of selecting a particular one of said totalizers for engagement with the differential actuator segments 190. The righthand end of the tube 218 (Figs. 14 and 17) is enlarged and has an annular groove 223, which cooperates with a shifting member 224 slidably mounted on a stud 225 projecting inwardly from the frame 56. A roller 226 on the shifting member is embraced by a spiral groove in a drum-shaped selecting cam 227 rotatably mounted on the shaft 222, and has secured to one end thereof a gear 228 meshing with the differentially movable segment 151. This segment 151, as previously explained, is differentially settable under the control of the clerks' keys 42 (Fig. 2) and when so set rotates the gear 228 and the selecting cam 227 correspondingly, which by means of the plate 224 shifts the tube 218 to select a totalizer commensurate with the depressed clerk's key 42.

Totalizer engaging mechanism

Figures 8, 9:
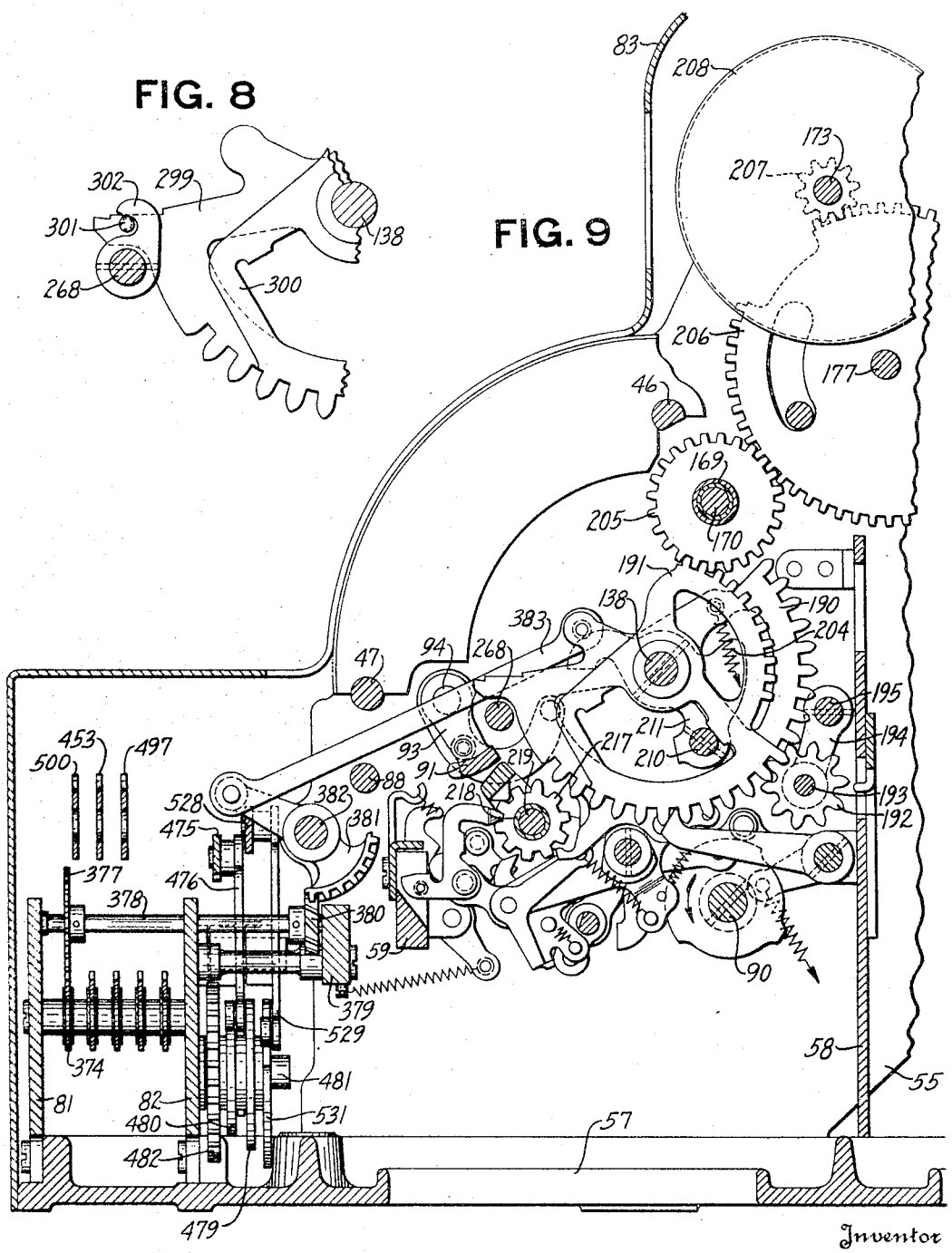
Fig. 8 is a detail view of the device for latching the overflow differential against movement in adding operations.
Fig. 9 is a sectional view of the machine as observed from the right and is taken just to the right of one of the amount differentials.

At the proper time during the operation of the machine, the entire totalizer assembly is rocked clockwise as viewed in Fig. 9 to bring the selected set of totalizer wheels 217 into engagement with the actuator segments 190 for adding and also in order that a total or a sub-total may be taken therefrom. The totalizer engaging mechanism embodied in the instant invention is substantially the same as that disclosed in U. S. Patent No. 1,929,652 issued October 10, 1933, to William H. Robertson, for which reason only a brief description of this mechanism is included in this specification.

In adding operations the selected totalizer is engaged with the actuator segments 190 after said segments have been set under the control of the perforated price ticket. The segments are then restored to normal positions to add the amount represented by the price perforated field of the ticket into the totalizer, which is then disengaged from the segments 190.

In total-taking operations the totalizer to be cleared is engaged with the segments 190 before they are set, thus rotating the wheels of the totalizer reversely to zero and setting the amount of the total on the segments, printing mechanism and indicators. The totalizer is then disengaged and the segments are restored idly to normal positions, leaving the wheels of said totalizer standing at zero.

In sub-total-taking operations the selected totalizer is engaged with the segments 190 before they are advanced, to rotate the wheels of said totalizer to zero, thereby setting the amount of the total on the printing mechanism and on the indicators. The totalizer in this case is held in engagement with the segments 190 until the latter are restored to normal positions, thus replacing the amount of the total on said totalizer wheels 217.

The totalizer engaging mechanism and the mechanism for selecting said engaging mechanism are best shown in Fig. 11. An arm 235 secured to the totalizer shaft 222 pivotally supports the lefthand end of a link 236. A stud 237 on the link 236 is embraced by an open slot in the end of a selecting lever 238 pivoted on a stud 239 in the frame 56. The link 236 is adapted to be rocked to bring a stud 240 therein into cooperative relation with any one of a series of three totalizer engaging levers 241, 242 and 199, which levers are operated by cams secured to the shaft 90. These cams are so timed respectively to operate the levers 241, 242 and 199 to engage the totalizers for adding, subtotal-taking and total-taking. Only one of the totalizer engaging cams is shown. This cam 197 operates the lever 199 to engage the totalizer for total-taking operations.

The means for determining which one of the levers 241, 242 and 199 is to engage the selected totalizer with the segments 190 in a particular operation includes the total control lever 43 pivoted on the rock shaft 138. A stud 244 on a downwardly extending arm 245 of the control lever projects into a slot 246 in the lever 238. The lever 43 normally rests in the add position in which it appears in Fig. 11. In this position the stud 240 is engaged with the "adding" lever 241. The lever 43 may be moved in a clockwise direction (Fig. 11) into two positions. Movement of the lever 43 into the first or "subtotal" position rocks the lever 238 one step, which in turn rocks the link 236 also one step, to bring the stud 240 into cooperative relation with the "sub-total" engaging lever 242. When the lever 43 is rocked into its second or "total" position, the stud 240 is brought into cooperative relation with the "total" engaging lever 199.

Total and sub-total taking mechanism

When a total or a sub-total is to be taken from one of the totalizers it is necessary in addition to determining the timing of the totalizer engaging mechanism to adjust other devices, such as interlocks, setting printing wheels, rocking out the zero stop arms, etc. An interlock is provided to enforce an idle operation of the machine preceding a total or subtotal-taking operation for the purpose of selecting the particular totalizer to be operated. This is made necessary due to the fact that the totalizer is shifted normally at the beginning of the operation by the clerk's differential mechanism (Figs. 2 and 14) as described above. It will be recalled that the totalizer is engaged with the segments 190 at the beginning of a total-taking or subtotal-taking operation, and since it is not desirable that the totalizer should be shifted longitudinally to select a totalizer and into mesh with the segments simultaneously, provision is made to enforce an idle operation before a total or sub-total may be taken.

It may be noted here that there is one exception to the above statement, that is, if the totalizer selected at the last operation is again selected for a total or subtotal-taking operation obviously the particular totalizer being already in aline- ment with the segments 190 is not shifted at the total-taking operation. When this condition ob- tains the idle operation is superfluous and is therefore dispensed with under the control of the interlocking mechanism now to be described.

The interlock to compel an idle operation pre- ceding a total taking operation includes a lever 247 (Figs. 11 and 13) pivotally supported on the rod 47. The upper arm 248 of this lever is adapted to cooperate with a stud 249 in the total control lever 43 and the lower arm 250 carries a stud 251 projecting beneath the arm 99, which arm it will be remembered is rocked clockwise upon depression of one of the clerks' keys 42. This clockwise movement of the arm 99 through the stud 251 rocks the lever 247 clockwise to bring the shoulder 252 on the upper arm of the said lever above the stud 249, thus preventing adjustment of the total control lever 43 until the lever 247 is restored to normal position (Fig. 13).

The lever 247 is restored to its normal posi- tion by engagement of the totalizer at the idle operation. When the lever 247 is rocked clock- wise it positions a finger 253 projecting from the lower end of the arm 250 into the path of move- ment of a stud 254 on the arm 220 of the totalizer frame. When the totalizer is rocked into en- gagement with the segments 190 the stud 254 rocks the lever 247 counterclockwise, removing the shoulder 252 from above the stud 249. The total control lever 43 is now free to be adjusted.

In the operation this interlock functions as follows: Assuming that at the last operation the No. 2 clerk's key 42 when depressed. During such adding operation, when the totalizer is rocked into engagement with the segments, the stud 254 restores the lever 247 to normal position. At the end of the operation the depressed "2" key re- mains depressed, as was set forth above. It is desired now to take a total from the totalizer se- lected under the control of the No. 6 clerk's key. The operator depresses the "6" key, which shifts the bar 68 downwardly, releasing the "2" key and rocking the arm 99 clockwise, which likewise rocks the lever 247 clockwise. This positions the shoulder 252 in the path of the stud 249, thus preventing adjustment of the total control lever 43. The operator now depresses the motor re- lease bar 44 and the machine operates through an idle operation during which the totalizer is shifted to aline the wheels 217 comprising the #6 totalizer with the segments 190. The total- izer is rocked into engagement with the segments during the idle operation, but since the total control lever could not be moved out of adding position the engagement occurs on adding time, which is after the totalizer is shifted to select the desired set of wheels 217. Engagement of the totalizer during the idle operation causes the stud 254 (Fig. 13) to again rock the interlocking lever 247 to its normal or ineffective position.

The operator may now set the lever 43 to con- trol the machine to take a total or sub-total from the selected totalizer.

When the lever 43 is raised to either its sub- total or total position the stud 249 is positioned to the right of a curved edge on the arm 248, thus blocking clockwise movement of the lever 247. This prevents clockwise movement of the arm 99 which by means of the detent 68 prevents depression of a key 42 and likewise prevents re- lease of the depressed clerk's key. The machine is then released by depression of the motor bar 44 and proceeds through its total-taking opera- tion. Should another key 42 be depressed at the end of the idle operation the arm 99 and the lever 247 are immediately rocked clockwise to prevent operation of the total control lever, thus setting up a condition to compel another idle operation.

In case it is desired to take a total from the totalizer selected by the 2 key which was de- pressed prior to the last adding operation, an idle operation is not necessary since the #2 total- izer is already in the selected position. Further- more the engagement of the totalizer at the add- ing operation renders the lever 247 ineffective to restrain the total control lever 43, so that in order to take a total when this condition obtains all that is necessary is to shift the total control lever 43 to the total position and operate the motor bar 44. The machine proceeds at once through a total-taking operation.

Means is provided to lock the total control lever in the add sub-total or total-taking position upon release of the machine for operation. This means includes an ear 260 (Fig. 12) bent at right angles to the upper end of an arm 261 extending up- wardly from the arm 92, which it will be remem- bered is rocked clockwise when the machine is released for operation. Upon clockwise move- ment of the arm 261 the ear 260 enters one of two notches 262 or 263 in a projection 264 of the lever 43 or assumes a position beneath the pro- jection 264, thus preventing displacement of the lever 43 from its adjusted position during the operation of the machine.

Figure 6:
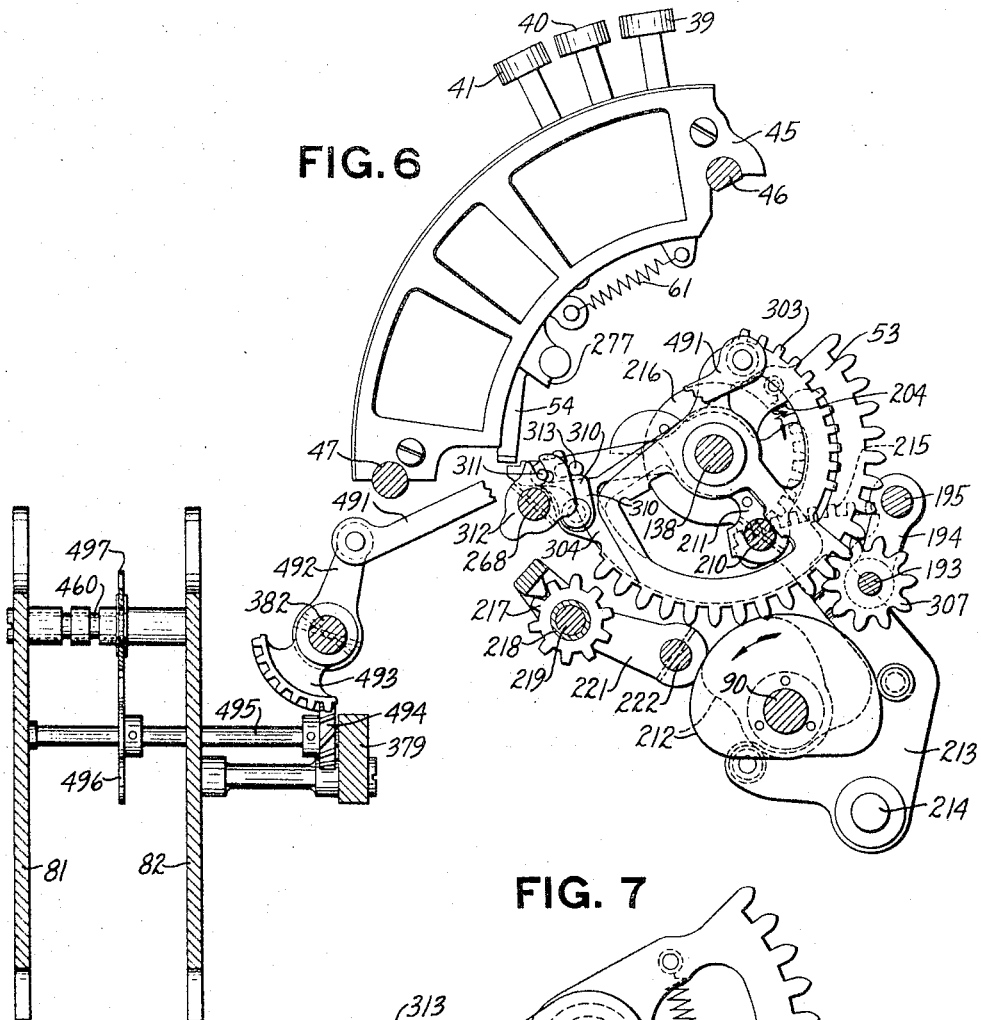
Fig. 6 is a detail view of the transaction differential mechanism.

Movement of the total control lever 43 from its add position to either its sub-total or total posi- tion operates mechanism to rock the zero stop arm 54 of the transaction bank to its ineffective position. The transaction bank, illustrated in Figs. 3 and 6, is the only bank in the present ma- chine which has the conventional zero stop arm 54. This is due to the fact that this is a combina- tion bank, used to record and indicate data in adding operations and to read or reset a group of overflow totalizer wheels in totalizing operations. A zero stop arm 54 is unnecessary for the clerks' bank for the reason that these keys are machine control keys and it is impossible to operate the machine unless one of these keys is depressed. The amount differentials of the instant machine have no zero stop levers, this condition being taken care of by the feeler or interpreting mech- anism in a manner later to be described.

Directing attention particularly to Figs. 3 and 12, moving the total control lever 43 clockwise out of adding position causes a camming surface 265 on a downward extension thereof, in cooperation with a roller 266 on an extension of an arm 267 fast on a shaft 268 journaled in the frames 55 and 56, to rock said arm 267 and said shaft 268 clock- wise. Fast on the shaft 268 is an arm 269 with a stud 270 adapted to cooperate with a hook- shaped extension 271 of an arm 272 loose on the shaft 94. The arm 269 has on the upper portion of its periphery a camming surface which co- operates with a stud 273 in the arm 272. Clock- wise movement of the shaft 268, as explained above, by means of the stud 270 and the cam- ming surface on the arm 269 in cooperation re- spectively with the extension 271 and the stud 273 imparts a counterclockwise movement to the arm 272, causing a stud 274 carried thereby to engage and rock the zero stop lever 54 clockwise out of the path of the segment 53 for the trans- action differential unit. Counterclockwise move- ment of the arm 272 rocks a bent-over ear 276 thereon under the beak of a plate 277 secured to the flexible detent 50. This locks the detent 50 in its upward position, thereby preventing depression of the transaction keys in totalizing operations. In adding operations depressing one of the transaction keys, by means of the detent 50, moves the beak of the plate 277 in the path of the ear 276 thereby blocking counterclockwise movement of the arm 272 and thus prevents moving the total control lever 43 away from adding position.

Wound around a collar on the shaft 268 (Fig. 5) is a torsion spring 278, the symmetrically formed ends of which are adapted to cooperate with a stud 279 in an arm 280 secured on the shaft 268 and with a stud 281 secured in the frame 55. When the total control lever 43 (Fig. 12) is returned counterclockwise to add position, the spring 278 returns the arm 280 and the shaft 268 counterclockwise to normal position, as here shown. The arm 269 and the stud 270 obviously return the arm 272 clockwise to normal position, as shown in Fig. 3.

Key releasing mechanism

Mechanism well shown in Figs. 3 and 4 is provided to release the depressed transaction keys 39, 40 and 41 near the end of machine operation. This mechanism includes a plate cam 282 secured to the shaft 90, the periphery of which cam is adapted to cooperate with a roller 283 carried by a pitman 284 which is bifurcated to straddle a collar on the shaft 90. The pitman 284 is pivotally connected to an arm 285 loose on a stud 286 secured in the left frame 55. The arm 285 is bifurcated to receive a stud 287 in an arm 288 secured on the shaft 88. Also secured on the shaft 88 is a release arm 289 adapted to cooperate with a stud 290 in the flexible detent 50.

As previously brought out the main shaft 90 makes one revolution each machine operation. Near the end of machine operation a node 305 of the cam 282 in cooperation with the roller 283 shifts the pitman 284 forwardly against the resistance of a compression spring 291. This rocks the arm 285 counterclockwise, which in turn rocks the arm 288, shaft 88 and arm 289 clockwise whereby the latter in cooperation with the stud 290 shifts the detent 50 downwardly to disengage the projection 49 from the stud 48 of the depressed transaction key. This releases the key to the action of a compression spring 292 which returns said key upwardly to normal position.

Manual means are also provided to release depressed transaction keys and includes a multi-armed lever 293 loose on a stud 294 in the left frame 55, one arm of said lever carrying a fingerpiece 295, which protrudes through an opening in the left side of the machine cabinet. The upper end of another arm 296 of the lever 293 is arranged to cooperate with a stud 297 in the arm 288. The lever 293 is urged clockwise and is normally maintained against a stop stud (not shown) by a spring 298. Counterclockwise manipulation of the lever 293 causes the upper end of the arm 296 in cooperation with the stud 297 to rock the arm 289 clockwise to release the depressed transaction key in the manner described above.

Combination differential

In the instant machine each totalizer has seven denominational wheels and there is necessarily a differential unit for each denomination. However, only the five lower denominations are operatively connected to the price ticket interpreting mechanism, and the 6th and 7th denominations are what are termed "overflow units." The differential mechanism for the 6th denomination functions only in totalizing operations to read or reset the selected totalizer wheels 217 for that denomination. A fragmentary view of the 6th denomination differential mechanism is shown in Fig. 8, and includes a differential segment 299 loose on the shaft 138, and a companion indicator and type carrier setting segment 300, also loose on the shaft 138. Like the lower denomination segments the segment 299 is urged in a clockwise direction by means of a spring like the spring 204. However, in adding operations this segment 299 is retained in home position by means of a stud 301 therein, in cooperation with a latch 302 secured on the shaft 268. It will be recalled by referring to Fig. 12 that moving the total control lever 43 out of adding position, in which position it is here shown, imparts clockwise movement to the shaft 268 thereby disengaging the latch 302 from the stud 301. In totalizing operations the 6th denomination wheel for the selected totalizer is meshed with the segment 299 at the beginning of the machine operation. Consequently initial operation. At the beginning of movement clockwise of the universal rod 210 (Fig. 9) allows the segment 299 to move in unison therewith under the action of its spring to reversely rotate the totalizer wheel 217 to zero position, which position is determined by means of a long tooth on said wheel engaging the inner surface of the transfer pawl for that denomination.

If the totalizing operation being performed is a clearing or resetting operation, the totalizer wheel is disengaged from the segment 299 prior to the beginning of its return movement counterclockwise. If the operation is a reading or subtotalizing operation, the totalizer remains engaged with the segment 299 during its return movement counterclockwise, so that the amount will be replaced on said wheel.

After the universal rod 210 completes its initial movement clockwise, which movement returns the segment 300 to normal or zero position, a coupling pinion similar to the pinion 192 (Fig. 9) couples the segments 299 and 300 together in the well known manner. In its return movement counterclockwise the rod 210 picks up the segment 299 and returns it to home or zero position, thereby rotating the segment 300 a like distance counterclockwise to position the indicator and type carrier for that denomination to record the amount on the totalizer wheel.

Transaction bank differential mechanism

As previously brought out, the seventh denomination or transaction bank is supplied with a combination differential mechanism. In adding operations this differential mechanism positions indicating, printing and card perforating mechanisms corresponding to the transaction key 39, 40 or 41 (Fig. 6) that is depressed. However, in adding operations this differential mechanism has no influence whatever over the seventh denomination totalizer wheels. In totalizing operations the differential mechanism ceases to function as a recording medium for the transaction keys, and instead is controlled by the seventh denomination totalizer wheels to indicate and record the amount standing on said totalizer wheels. This mechanism will now be described in detail.

Directing attention to Figs. 3, 6, 7 and 17, the differential segment 53 for the seventh denomination totalizer wheel and for the transaction bank is urged clockwise into communication with the universal rod 210 by one of the springs 204. This segment 53 differs from the ordinary amount differential segment 190 in that it has no teeth for communication with the totalizer wheels 217 but has only a plurality of teeth for coupling said segment 53 to an indicator and type carrier setting segment 303, loose on the shaft 138. In adding operations a forward extension of the segment 53 cooperates with the lower end of the transaction key. After the segment 53 has been differentially positioned by means of the depressed transaction key a coupling pinion 307 couples said segment 53 to the segment 303. Return movement counterclockwise of the universal rod 210 carries the segment 53 to home position and carries the segment 303 a corresponding number of steps counterclockwise to position the transaction indicators, type carriers and perforating mechanism commensurate with the value of the depressed transaction key. The coupling pinion 307 remains in effective position to maintain the coupling between the segments 53 and 303 at the end of machine operation. At the beginning of machine operation this pinion 307 is rocked counterclockwise to ineffective position and remains thus until after the universal rod 210 completes its initial movement to differentially position the segment 53 and to return the segment 303 to zero position.

Figure 7:
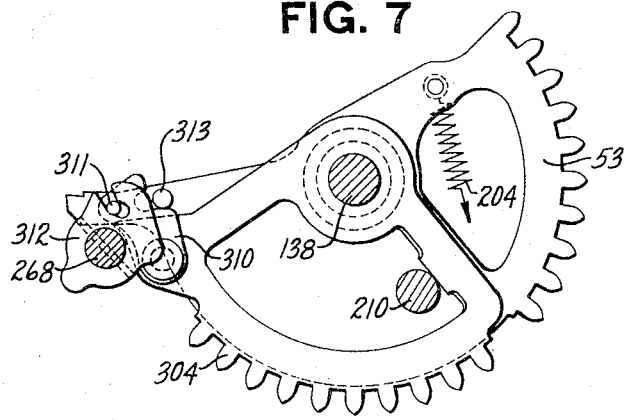
Fig. 7 is a detail view of the transaction differential showing particularly the coupling between the differential member and the totalizer actuator.

Interposed between the segments 53 and 303 (Figs. 6 and 7) and loosely supported by the shaft 138 is a total control differential segment 304 having a plurality of teeth adapted to mesh with the totalizer wheels 217 for the seventh denomination. Loosely connected to the segment 304 is a latch 310 with a stud 311 which extends within an irregular camming slot in a total control cam 312 secured on the shaft 268. The latch 310 has therein a notch adapted to hook over a stud 313 carried by the segment 53. The configuration of the slot in the came 312 is such that when the total control lever 43 is in adding position which, as previously brought out, positions the shaft 286, as shown in Figs. 6, 7 and 12, the notch in the latch 310 is maintained out of engagement with the stud 313. Moving the total control lever 43 out of adding position, to either total or sub-total position, by means of the arm 267 (Fig. 12) rocks the shaft 268 and cam 312 clockwise to engage the notch in the latch 310 with the stud 313 to integrally connect the segments 53 and 304. It is therefore obvious that in totalizing operations the segments 53 and 304 move as a single unit. It will also be recalled by referring to Figs. 3 and 12 that moving the total control lever 43 out of adding position rocks the zero stop lever 54 out of the path of the segment 53 and causes the arm 272 to lock the transaction keys against depression.

At the beginning of a totalizing operation the wheel 217 (Fig. 6) for the seventh denomination is rocked into engagement with the segment 304. Initial movement of the universal rod 210 allows the spring 204 to move the segments 53 and 304 in unison therewith to reversely rotate said totalizer wheel to zero which as previously stated positions the segment 53 commensurate therewith. After the segment 53 has thus been positioned the coupling pinion 307 couples said segment 53 to the segment 303 so that return movement counterclockwise of the universal rod 210 through the medium of said coupling positions the indicators and type carriers for that denomination commensurate with the amount on the totalizer wheel 217.

INTERPRETING AND PERFORATING MECHANISMS

*Explanation of operation*

In explaining the interpreting and perforating mechanisms it is thought best to start with an explanation of a typical system embodying the use of the machine of the present invention. The system chosen as an example is that employed by a department store in checking the sales of various articles by individual clerks and by departments. While the present machine is admirably adapted to handle such a system, still it is not desired to limit this machine to any particular line of endeavor, as it is readily adaptable to various other businesses.

In the chosen system there is prepared in advance a price tag or ticket for each article, or in some cases a ticket for each group of articles in one package, etc. A facsimile of such a ticket 306 is shown in Fig. 34. This ticket is divided into two sections which are easily separated by tearing. The upper portion of the ticket has printed thereon the name of the company, United Dry Goods Company, the price of the article, which in this case may be a shirt, $3.50, color of article: blue, size of article 15½, and a manufacturer's number 230. The lower portion of the price ticket is divided into four vertical columns and these columns are divided into five equal spaces or squares, which in the present machine is the maximum number of denominations used for the price of the article. By referring to Fig. 35 it will be seen that the two upper squares in the lefthand column are reserved for an identification number for the color of the article. The three lower squares in the lefthand column are used for the size of the article. The second column is used for the manufacturer's number. The first square in the third column is reserved for a machine number, the second square for a clerk's number, the third square for a number representative of the type of transaction performed by the machine, and the last two columns in this row are reserved for a department number. The entire righthand column of the price ticket is reserved for the price of the article. The numbers in the different columns are read from the top downwardly; therefore the bottom square in the price column is units of cents, the next square tens of cents, the next square units of dollars, and so on.

Fig. 36 illustrates a suggested four-hole code system for use in the present machine. By comparing the price ticket shown in Fig. 34 with the code chart it will be seen that the data printed on the top portion of the ticket has been perforated in the lower portion of the ticket. In this case 12 is the representative number for the color blue, and the size number has been perforated 15.5, in this case using the decimal equivalent for ½.

The price ticket 306 as shown in Fig. 34 is attached to the article by its upper portion, and the clerk making the sale detaches the lower or perforated portion of the ticket and inserts it in a carriage 314 (Figs. 1 and 26) located at the front of the machine. The clerk then moves the carriage into operating position. An interlocking mechanism between the machine releasing mechanism and the ticket carriage prevents releasing the machine for operation unless the carriage is moved all the way in. Likewise this mechanism locks the carriage in operating position until the machine operation is completed. A beveled corner of the price ticket 306 in cooperation with a feeler mechanism prevents moving the carriage all the way in to operating position unless the ticket is properly inserted in said carriage.

After moving the carriage to operating position the clerk sets up the type of transaction on the keyboard, in this case a cash transaction, and his (the clerk's) number, in this case 4, by depressing the No. 4 clerk's key, if his key is not already depressed, and releases the machine for operation by depressing the starting bar 44. Upon operation of the machine the No. 4 totalizer is selected for engagement with the actuators and a feeler mechanism picks up the price of the article from the perforated ticket, positions the differential actuators accordingly, thereby causing the price of the article sold to be entered in the proper clerk's totalizer, to be visibly indicated, and printed upon record material.

During operation of the machine, perforating mechanism differentially positioned under the influence of the depressed clerk's key and the depressed transaction key, causes the clerk's number, in this case 4, and a representative number, in this case 3, for the cash transaction, to be perforated respectively in the second and third spaces from the top (Fig. 35) of the third column from the left of the price ticket 306. Also a preset and fixed unit of the perforating mechanism causes the machine number, in this case 7, to be perforated in the first division of the third column.

Near the end of machine operation the price ticket is ejected from the carriage and deposited in a receptacle 315 (Fig. 1) located on the right-hand side of the machine. Immediately thereafter the mechanism that locks the carriage in operating position is released and the carriage is spring returned forwardly to normal position. The price interpreting mechanism and the perforating mechanism will now be described in detail.

Ticket carriage

Directing attention to Figs. 1 and 26 the ticket carriage 314 carries two studs 316 extending within symmetrical longitudinal slots 317 in a perforator die plate 318 secured to a perforator punch frame 319 secured between the frames 81 and 82 (Fig. 27). A spring 320 is tensioned to urge the carriage 314 forwardly to normal or loading position, which position is determined by means of the studs 316 in cooperation with the slots 317. The carriage 314 has upturned lugs 321 and 322 which in cooperation with an undercut portion of the plate 318 and two square studs 323 form a nest for the detached portion of the price ticket. When the carriage 314 is moved to operating position the price ticket 306 is carried into an opening between the frame 319 (Fig. 27) and the die plate 318. The lower or beveled edge of the ticket is moved into engagement with a spring plunger 330 supported in a hub in a bracket 331 fast to the frame 82. This insures proper location of the ticket and assists in retaining said ticket in its nest in the carriage during interpretation and perforation thereof.

Pivoted to the plate 318 is a pawl 324 urged counterclockwise by a comparatively weak spring 325 to normally maintain a stud 326 carried by said pawl 324 in contact with a projection of the frame 318. The pawl 324 has a hook 327 adapted to cooperate with a down-turned ear 328 of the carriage 314 to prevent pushing the carriage all the way to operating position when the ticket is wrongly inserted in said carriage. When the ticket is properly inserted in the carriage, as shown by dot and dash lines in Fig. 26, the beveled edge thereof clears the stud 326 when the carriage is moved to operating position. Consequently no movement is imparted to the pawl 327 and full movement of the carriage is not obstructed. In case the ticket is wrongly inserted in the carriage, the corner thereof contacts the stud 326 and rocks the pawl 324 clockwise to move the hook 327 into the path of the projection 328 to obstruct continued movement of the carriage 314.

An upturned extension 329 (Fig. 26) of the carriage 314 forms a convenient fingerpiece for advancing said carriage to operating position.

Carriage locking mechanism

Locking mechanism between the machine releasing mechanism and the price ticket carriage prevents releasing the machine for operation unless the carriage is in operating position. This locking mechanism also locks the carriage in operating position until after the ticket is ejected therefrom which occurs near the end of machine operation. This mechanism in cooperation with the pawl 324 (Fig. 26) prevents releasing the machine for operation unless the price ticket is properly inserted in the carriage. The carriage locking mechanism will now be described in detail.

Referring to Figs. 24, 25 and 26, the carriage 314 has a down-turned ear 335 and a projection 336 adapted to cooperate with the lefthand edge 337 of a locking arm 338 loose on a stud 339 in the plate 318. The righthand end of a bar 340 is pivoted to the arm 338 while an upturned extension 341 of said bar has a horizontal slot into which projects a stud 342 in the frame 82. The extension 341 has a vertical slot into which projects a stud 343 in a lever 344 loose on a stud 345 in the frame 82. The lever 344 has a stud 346 embraced by a bifurcated downward extension of a bell crank 347 pivoted at 348 to the frame 82. The hook-shaped end of an extension 349 of the bell crank 347 is adapted to cooperate with an arm 350 of the lever 87 (see also Figs. 12 and 37).

When the carriage 314 (Fig. 24) is in its forward or normal position the ear 335 in cooperation with the edge 337 restrains counterclockwise movement of the arm 338 under the influence of a spring 351. As the ear 335 moves beyond the rear end of the surface 337 the projection 336 continues to restrain movement of the arm 338. When the carriage is moved all the way to operating position the projection 336 moves beyond the end of the arm 338 allowing the spring 351 to rock said arm counterclockwise to lock the carriage in operating position. Counterclockwise movement of the arm 338 by means of the bar 340 rocks the lever 344 (Fig. 25) clockwise, which in turn imparts counterclockwise movement to the bell crank 347 to cause the extension 349 in cooperation with the arm 350 to rock the lever 87 counterclockwise as viewed in Figs. 11, 12 and 37. This moves the extension 86 of the lever 87 out of the path of the projection 89 of the release bar 78, thereby permitting release of the machine in the manner explained earlier herein.

Clockwise movement of the shaft 88 (Fig. 3), to release the depressed transaction key near the end of machine operation, by means of an arm 352 secured on the righthand end thereof (Figs. 25 and 28) returns the bell crank 347 clockwise, which by means of the lever 344 and the bar 340 restores the arm 338 clockwise out of the path of the projection 336. The spring 320 then returns the price ticket carriage 314 forwardly to normal position. It will be recalled that the return of the carriage in the manner explained above is not effected until after the price ticket has been ejected therefrom.

It will be remembered that in totalizing operations no price ticket is used; therefore it is necessary, in such operations, to be able to release the machine without moving the ticket carriage to operating position, and this is effected by means of mechanism illustrated in Fig. 12. Moving the total control lever 43 away from adding position by means of the surface 265 in cooperation with the roller 266 rocks the arm 267 clockwise. This causes a stud 354 in an extension 360 of the arm 267 in cooperation with a foot-shaped extension 361 of the lever 87 to rock said lever counterclockwise against the tension of a spring 362 to move the extension 86 out of the path of the projection 89 of the bar 78 to permit release of the machine in totalizing operations. The spring 362 also returns the lever 87 clockwise to effective position when the mechanism pictured in Fig. 25 is returned to normal position by the arm 352 in the manner explained above.

Price interpreting mechanism

Operation of the machine with the ticket carriage in operating position causes the interpreting mechanism to pick up the price of the article from the perforations in the ticket. The interpreting mechanism then differentially positions the totalizer actuators to cause this amount to be added into the totalizer selected by the clerk operating the machine. Moving the total control lever out of adding position to either read or reset position renders the interpreting mechanism ineffective so that the differential actuators may be positioned by the wheels of the selected totalizers to indicate and record the amount contained in said totalizers. Failure to insert a ticket in the carriage in adding operations renders mechanism effective, upon operation of the machine, to retain the interpreting and differential positioning mechanism in zero positions, thus preventing the entry of a false amount in the selected totalizer. The mechanism briefly outlined above will now be described in detail.

Inasmuch as the interpreting or pickup mechanism is duplicated in each denominational unit, it is felt that the description of the mechanism for one denominational unit will be sufficient for the purpose of this specification. Figs. 19 and 23 picture in detail the interpreting mechanism for the fifth or one hundred dollar denominational unit; consequently this unit will be described.

Feelers

It will be recalled that in the present system a combination of four holes is used for the ten digits in each denomination. Consequently there are four feelers for each denominational unit. There are two feelers 363 (see also Fig. 18) and two feelers 364, with fingers 365 and 366 respectively, adapted to feel for the holes in the one hundred dollar division of the price ticket. The feelers 363 and 364 are loose on a shaft 367 journaled in the frames 81 and 82, and said feelers have respectively teeth 368 and 369 adapted to cooperate with symmetrical notches 370 and 371 in differential bars 372 and 373 respectively (see also Figs. 20 and 30). The bar 373 is secured in fixed relation to the bar 372, which in turn is pivoted on a rack 374 with two horizontal slots adapted to loosely fit flanged rollers 375 on studs 376 extending between the frames 81 and 82. Suitable washers and collars are provided to properly space the denominational racks on the studs 376. The teeth of the rack 374 mesh with a segment 377 secured on the forward end of a shaft 378 journaled in the frame 81 and in a bar 379 secured by a plurality of studs to the plate 82 (see Figs. 9 and 17). Secured on the rearward end of the shaft 378 is a gear 380 meshing with a segment 381 loose on a shaft 382 journaled in the main frames 55 and 56. An arm of the segment 381 is connected by a link 383 to the one hundred dollar totalizer actuator segment 190.

Feeler positioning

Referring to Figs. 18, 19, 23 and 38, springs 384 urge the feelers 363 and 364 counterclockwise to normally maintain them in contact with a rod 385 supported by two symmetrical arms 386 secured to the shaft 367. The shaft 367 (Figs. 11, 37 and 38) has secured on the rearward end thereof a lever 387 with a stud 388 embraced by the bifurcated extension of a lever 389 loose on a feeler liner shaft 390 journaled in the frames 81 and 82. A lefthand extension of the lever 389 cooperates with the forward end of a lever 391 loose on the shaft 382. The lever 391 carries a stud 392 which cooperates with a projection 393 of the release bar 78.

Downward releasing movement of the bar 78 (Figs. 11, 12 and 37) caused by depressing the release bar 44 moves the projection 393 away from the stud 392. Consequently the rod 385 (Fig. 23) no longer restrains the feelers 363 and 364 against counter clockwise movement under the influence of the springs 384. If the feeler fingers 365 or 366 find holes or perforations in the price ticket this allows the tooth 368 or 369 of said feelers to move into position to engage the notches 370 or 371 of the respective selecting bars 372 or 373. The manner in which the feelers are restored to normal positions after the differentials are positioned will be described later.

Feeler alining mechanism

After the feelers 363 and 364 (Figs. 23 and 30) have been positioned at the beginning of machine operation, as explained above, they are retained in position by means of two notches 394 therein in cooperation with an aliner bar 395 connected by symmetrical arms 396 to the shaft 390 (see also Fig. 21). Secured to the shaft 390 is an arm 397 connected to a pitman 398 with a slot 399 through which projects a shaft 400 journaled in the frame 82 (Fig. 30) and a bracket 401 secured to the machine base. The pitman 398 carries two rollers 402 which cooperate with the peripheries of companion cams 403 and 404 secured on the shaft 400. Secured on the forward end of the shaft 400 (Figs. 11, 30 and 31) is a gear 410 which meshes with a similar gear 411 secured on a shaft 412 journaled in the frame 82 and in a bracket 413 secured to the machine base 57. A gear 414 is secured on the rearward end of the shaft 412 and meshes with a driving gear 415 secured on the main drive shaft 90.

As previously stated, the main drive shaft 90 makes one counterclockwise rotation, as viewed in Fig. 11, each machine operation. This by means of the gear 415 in cooperation with the gear 414 drives the shaft 412 and gear 411 also one counterclockwise rotation as viewed in Fig. 31. The gear 411 in cooperation with the gear 410 rotates the shaft 400 one clockwise rotation during machine operation. At the beginning of the operation and after the feelers 363 and 364 (Figs. 19 and 23) have been positioned by means of the perforated price ticket, as explained previously, clockwise movement of the shaft 400 and the companion cams 403 and 404 (Fig. 21) shifts the pitman 398 downwardly to impart counterclockwise movement to the shaft 390 to cause the liner 395 to engage either of the notches 394 to secure the feelers in set position.

*Selecting bar operating mechanism*

Immediately after the feelers 363 and 364 have been alined the selecting bars 372 and 373 (Fig. 23) are moved upwardly by mechanism now to be described, to place the notches 370 and 371 in said bars in communicative relationship with the teeth 368 and 369 of said feelers 363 and 364. This is accomplished in the following manner.

Directing attention to Figs. 19 and 23, the selecting bar 372 has a downwardly extending hook 416 which forms a notch adapted to cooperate with a roller 417 loose on a stud extending between an upward extension 418 of a selecting bar control arm 419 loose on a shaft 420 extending between the frames 81 and 82, and a plate 421 secured to the arm 419. A spring 422 urges the arm 419 clockwise into communication with a rod 423 (see also Figs. 19, 30, 31 and 38) extending between arms 424 and 425 secured on opposite ends of the shaft 420. A downward extension of the arm 424 has pivotally connected thereto the righthand end of a link 426, the lefthand end of which is bifurcated to straddle the shaft 400. The link 426 carries a roller 427 (Fig. 31) which cooperates with a cam race cut in the gear 410. The arm 424 and connected mechanisms are locked in home positions by means of a projecting beak 428 of said arm 424 in cooperation with a hook 429 of a pawl 430 loose on the shaft 367. The pawl 430 is flexibly connected to the arm 387 by means of a spring 432 stretched between said arm and said pawl, said spring adapted to maintain said pawl 430 normally in engagement with a stud 431 carried by the arm 387. The functioning of the pawl 430 is of consequence only in totalizing operations at which time it restrains clockwise movement of the arm 424 for a purpose later to be described.

Counterclockwise movement of the arm 387 (Figs. 31 and 38) caused by releasing the machine for operation as explained above, rocks the hook 429 out of the path of the beak 428. Immediately thereafter the cam race in the gear 410 (see chart Fig. 16) in cooperation with the roller 427 shifts the link 426 to impart clockwise movement to the arms 424 and 425 and the shaft 420 to raise the rod 423. Under tension of the spring 422 (Fig. 23) the arm 419 moves clockwise in unison with the rod 423 and by means of the roller 417 in cooperation with the lower edges of the selecting bars 472 and 473 moves the top edges of said bars into communication with the teeth 368 and 369 of the feelers 363 and 364 which it will be understood have previously been alined in said positions.

*Positioning of the differential mechanism*

Immediately thereafter the universal rod 210 (Figs. 9 and 16) starts its initial movement clockwise and the differential segment 190 under influence of the spring 204 moves in unison therewith. This by means of the link 383 imparts clockwise movement to the segment 381, which in turn rotates the shaft 378 and segment 377 clockwise as viewed in Fig. 23, to shift the rack 374 and selecting bars 372 and 373 toward the left as here viewed. During this lefthand movement of the rack 374 the top edges of the selecting bars 372 and 373 are retained in resilient engagement with the teeth 368 or 369 of the feelers 363 or 364 which are in effective position due to their fingers 365 or 366 having entered a perforation in the price ticket. When the notches 370 or 371 in the selecting bars coincide with the teeth 368 or 369 of the effective feelers, the arm 419 moves said notches into engagement with said teeth thus stopping the bars 372 and 373 and consequently stopping the rack 374 in a position controlled by the perforation in the price ticket. Such differential positioning of the rack 374, by means of the connecting mechanism related above, is transmitted to the segment 190 (Fig. 9) to position said segment commensurate with the value of the perforations in the price ticket.

Immediately after the universal rod 210 completes its initial movement clockwise the hundreds wheel 217 of the selected totalizer is moved into engagement with the amount actuator segment 190. Return movement counterclockwise of the universal rod 210 returns the amount segment 190 to zero position to rotate the totalizer wheel a proportionate number of steps to cause the amount perforated in the price ticket to be added into the selected totalizer.

Prior to return movement of the universal rod 210 (Fig. 9) and the actuator segment 190, the feelers 363 and 364 and the selecting bars 372 and 373 (Fig. 23) are returned to normal positions, see chart Fig. 16. In the case of the feelers this is accomplished by companion cams 433 and 434 (Figs. 22, 30 and 31) in cooperation with rollers 435 in a pitman 436 slotted to embrace the shaft 400 and also slotted to receive a stud 437 in the arm 387. The slot in the pitman 436 has sufficient clearance to allow counterclockwise movement of the stud 437 and the arm 387 (see also Fig. 37) upon release of the machine for operation. Prior to the return actuating movement of the universal rod 210 and the segment 190 the companion cams 433 and 435, which make one clockwise revolution each machine operation, shift the pitman 436 toward the left as viewed in Figs. 22 and 31, which by means of the stud 437 restores the arm 387 and the shaft 367 clockwise to normal positions. This by means of the rod 385 (Fig. 23) simultaneously restores the feelers 363 and 364 to normal positions, as here shown. The contour of the cams 403 and 404 (Fig. 21) is such that the liner 395 is disengaged from the notches 394 in the feelers 363 and 364 prior to their return movement to normal positions. The pitman 436 in addition to restoring the interpreting feelers 363 and 364 also operates a price ticket ejector tension device, which will be described later.

At substantially the same time that the feelers are restored to normal positions the arm 419 (Fig. 23) and the selecting bars 372 and 373 are likewise restored to normal positions as here shown. This is accomplished by means of the cam groove in the gear 410 (Fig. 31) which in cooperation with the roller 427 and the link 426 imparts counter clockwise movement to the arms 424 and 425 and the shaft 420 to lower the rod 423 to return the arm 419 and the selecting bars 372 and 373 to normal positions.

Zero stop mechanism

It is, of course, understood that the actuator segment 190, the rack 374 (Figs. 9 and 23) and the selecting bars 372 and 373 are invariably returned to zero positions, as here shown, at the end of each machine operation. It will also be recalled that the amount banks connected with the feeler or pick-up mechanism have no zero stop levers as does the transaction bank. In this instance the zero stop levers are unnecessary because zero has a perforated code in the price ticket, the same as any other number, (Fig. 20) while in the case of the conventional key operated amount banks there are no zero keys to stop the actuators. The thousand dollar overflow bank needs no zero stop lever because the arm 302 (Fig. 6) retains the segment 299 in zero position during all adding operations. However, in the present machine, as an added precaution, the racks 374 and connected mechanisms are locked in zero positions in the following manner: When the finger 366 of the feeler 364 enters a zero perforation in the price ticket, the tooth 369 of said feeler moves downwardly into position to be engaged by the notch 370 in the zero position on the bar 372. Consequently as the zero notch 370 is directly opposite the tooth of the only effective feeler, there is nothing to interfere with full upward movement of the bar 372 and the arm 419. This allows a projection 438 of the arm 419 to move into the path of a projection 439 on the rack 374 to retain said rack in zero position (see also Figs. 19 and 20). In the case of all numbers except zero the effective feeler or feelers, in cooperation with the top edges of the selecting bars 372 or 373 obstruct immediate full upward movement of said bars and consequently the selecting arm 419 thereby retaining the projection 438 of said arm 419 out of the path of the projection 439 until the rack 374 moves away from zero position.

By referring to Figs. 34 and 35 it will be observed that the zero perforations are omitted in the price ticket in the higher denominations. This has a bearing only on a later step of the sales system wherein standard tabulating machine cards are prepared from the price tickets. However, the present machine is arranged so that when a blank portion of the price field is presented to the feeler mechanism of a particular denomination the differential mechanism for that denomination will be retained in zero the same as when the perforated code for zero is presented to the feeler mechanism.

When an unperforated portion of the price ticket is presented to the feelers 363 and 364 (Fig. 23) for the hundreds of dollars denomination, naturally these feelers are retained in ineffective positions and consequently their teeth 368 and 369 do not interfere with upward movement of the selecting bars 372 or 373 and the selecting arm 419. Therefore upon operation of the machine the projection 438 of the arm 419 moves into the path of the projection 439 of the rack 374 to obstruct lefthand movement of said rack thereby retaining it and connected mechanism in zero position. The roller 417 carried by the arm 419 in cooperation with the hook 416 of the bar 372 insures retention of the bars 372 and 373 in normal positions, as shown in Fig. 23, while the feelers 363 and 364 are being positioned so that the top edges of said bars cannot in any way interfere with the positioning of said feelers.

In case the machine is inadvertently operated without a price ticket being inserted in the ticket carriage, locking mechanism is provided to retain the rack 374 (Fig. 23) and connected mechanism in zero position. Otherwise the rack 374 would travel to the ninth position thereby creating an erroneous condition in the selected totalizer.

Extending between the frames 81 and 82 (Figs. 19 and 23) is a rod 440 loosely supporting two symmetrical arms 441 which straddle the feelers 363 and 364 for all denominations. The arms 441 are connected by a bail 442 adapted to cooperate with projections 443 on the selecting bar 372. A spring 444 urges the bail 442 counterclockwise to normally maintain a rod 445 supported by upward extensions of the arms 441 normally in contact with the upper edges of the feelers 363 and 364. Obviously when one of the feelers 363 or 364 in any of the five denominational groups is retained in ineffective position by an unperforated portion of the price ticket, the bail 442 is retained in its ineffective position as shown in Fig. 23. It is also obvious by referring to the price ticket code (Fig. 36) that whenever a price ticket is inserted in the machine, some of the feelers will be retained in ineffective positions as all four perforations, which constitute the combination for the different digits, are never used at the same time.

When the machine is operated without a price ticket being inserted therein, upon release of the machine for operation, all of the feelers 363 and 364 for the five denominations move counterclockwise to effective positions. This by means of the rod 445 allows the bail 442 to move in unison with said feelers and into the path of the projection 443 of the bar 372 to retain the rack 374 and associated differential actuator mechanism in zero position. It is of course understood that the bail 442 moves to effective position before any movement is imparted to the rack 374 under influence of the universal rod 210, (Fig. 9) the differential actuator segment 190 and connecting mechanism.

Interpreting mechanism in totalizing operations

It will be recalled that in the "General description" it was brought out that in totalizing operations it is necessary to disable the interpreting mechanism so that the differential actuators which control the indicating and printing mechanisms may be positioned by the wheels of the selected totalizer. This is accomplished by retaining all the feelers 363 and 364 (Fig. 23) and the selecting arms 419 in ineffective positions as here shown.

It will be recalled by referring to Fig. 12 that moving the total control lever 43 clockwise away from adding position to either read or reset position, by means of the surface 265 thereon, in cooperation with the roller 266 imparts clockwise movement to the arm 267 causing the roller 354 to rock the lever 87 counterclockwise to move the extension 86 thereof out of the path of the projection 89 on the release bar 78. It is, therefore, obvious that in totalizing operations release of the machine is no longer dependent upon moving the ticket carriage 314 (Figs. 24 and 25) all the way to operating position.

This counterclockwise movement of the arm 267 moves a hook 446 on the extension 360 thereof into the path of a projection 447 of the lever 391 to obstruct clockwise movement of said lever upon release of the machine. This by means of the levers 289 (Figs. 31, 37 and 38) and 387 prevents counterclockwise movement of the shaft 367 (Fig. 23) and the rod 386 under the influence of the feelers 363 and 364 and their springs 384. It is readily seen that this retains all the feelers in ineffective positions during totalizing operations irrespective of whether or not a perforated price ticket is inserted in the machine.

Inasmuch as the lever 387 (Figs. 31 and 38) receives no counterclockwise movement the pawl 430 remains in effective position as here shown, with its hook 429 blocking clockwise movement of the arms 424 and 425, the shaft 420 and the rod 423. Consequently when the gear 410 revolves clockwise during the machine operation the link 426 and connected mechanism remain stationary, the roller 427 remaining in a clearance portion of the cam groove in the gear 410. It is therefore evident that the selecting arms 419 (Fig. 23) remain in ineffective position as here shown, and neither these arms nor the feelers 363 or 364 interfere with the movement back and forth of the selecting bars 372 and 373, the rack 374 and connected differential mechanism in totalizing operations, thereby permitting the differential actuators to be positioned under influence of the wheels of the selected totalizer.

Perforating mechanism

As stated previously, the machine of this invention is adapted to perforate additional data in the price ticket during the interpretation of the sale price. This additional data is perforated in the third column of the price ticket 306 (Fig. 35) and consists of a machine number which is perforated in the top square of the third column, a clerk's number perforated in the second square of the third column, and a number corresponding to the type of transaction, cash, charge or C. O. D., which is perforated in the third space of the third column. Inasmuch as the perforating mechanism is substantially duplicated for the transaction number, the clerk's number and the machine number, it will be described specifically in connection with the clerk's number mechanism. The only explanation being given of the transaction and the machine number perforating mechanism is wherein they differ from the clerk's perforating mechanism.

Clerks' number rack mechanism

Figure 2:
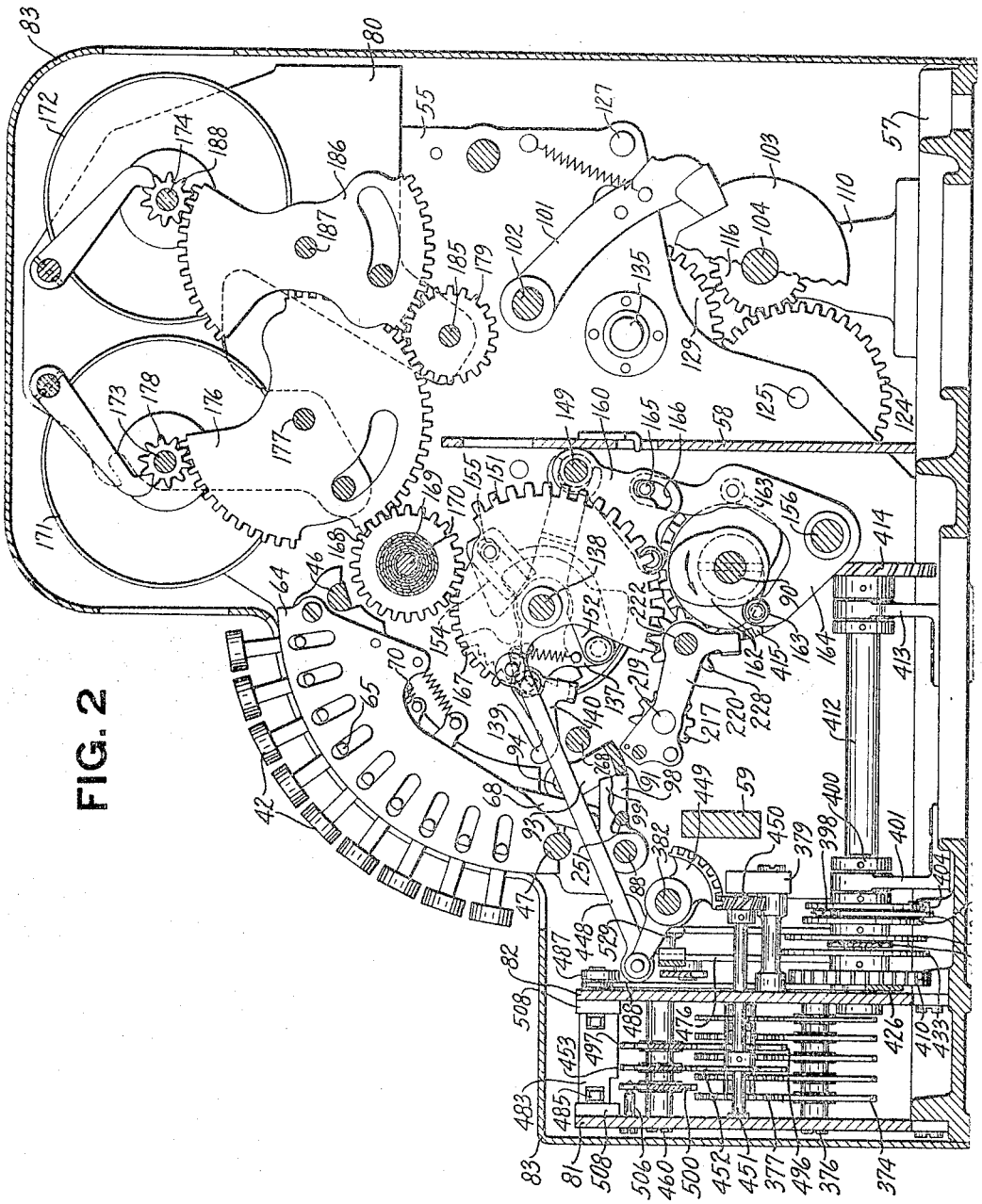
Fig. 2 is a sectional view of the machine as observed from the right and taken just to the right of the row of clerks' keys.

By referring to Figs. 2 and 14 it will be recalled that the row of clerks' keys 42, by means of the latch 140 and associated mechanisms, control the differential positioning of the segment 151, which in turn selects one of the nine totalizers corresponding to the clerk's key depressed, and likewise positions the clerk's indicating and printing mechanism commensurate with the depressed clerk's key. This differential positioning of the segment 151 is transmitted to the clerk's number perforating mechanism by means of a link 448 which pivotally connects the segment 151 to an upward extension of a segmental gear 449 (Figs. 2 and 17) loose on the shaft 382 and meshing with a gear 450 secured on a shaft 451 opposite ends of which are journaled in the frame 81 and the bar 379. Secured on the forward end of the shaft 451 (Figs. 19, 29 and 32) is a segmental gear 452 meshing with teeth on the lower edge of a perforator control rack 453 having two horizontal slots 454 which fit loosely on flanged rollers 459 loose on studs 460 extending between the frames 81 and 82. As in the case of the interpreting racks 374, suitable washers and collars are provided to properly space the perforating racks on the studs 460.

Pivotally connected to a righthand extension of the rack 453 (Figs. 29, 32 and 33) is a perforator selecting and operating bar 461 having integral therewith a similar bar 462. The bars 461 and 462 have matched horizontal slots 463 which cooperate with an anti-friction sleeve 464 turnably mounted on a stud 465 extending between symmetrical arms 458 and 466 secured on a shaft 467 opposite ends of which are journaled in the frames 81 and 82.

The bars 461 and 462 have a plurality of projections 468 adapted to cooperate with the upper ends of four perforating punches 469 for the clerk's number. The punches 469 are mounted for vertical sliding movement by means of holes in an upper guide plate 470 secured to the frame 319 and by means of guide holes in the frame 319 which aline said punches with perforating holes in the die plate 318. Pivoted to extensions of the levers 458 and 466 are symmetrical arms 471 connected at their lower ends by a right-angled bail 472 with holes therein to receive the punches 469. Enlarged portions 473 of the punches 469 form shoulders, which in cooperation with the bail 472 provide a means of stripping the punches from the perforated price ticket and returning and retaining said punches in normal positions as here shown. The enlarged portions 473 of the punches also form upward shoulders which in cooperation with the plate 470 prevents accidental removal of said punches.

Secured on the rearward end of the shaft 467 (Figs. 29, 31 and 32) is an arm 474 connected by a link 475 to one arm of a Y-shaped lever 476 loose on a stud 477 fast in the frame 82. The lever 476 carries two rollers 478 adapted to cooperate with the peripheries of companion cams 479 and 480 loose on a stud 481 secured in the frame 82. Integral with the cams 479 and 480 is a gear 482 (Fig. 31) which meshes with the gear 411 and is driven thereby one clockwise rotation each machine operation.

Differential positioning of the segment 151 (Figs. 2 and 14) under influence of the depressed clerk's key, as explained earlier herein, by means of the link 448, segment 449, gear 450, shaft 451 and segmental gear 452 (Figs. 29 and 32) differentially positions the rack 453 and the bars 461 and 462 according to the position of the depressed clerk's key. After the rack 453 has been thus positioned it is alined and retained in position by means of an alining bar 483 in cooperation with one of a plurality of notches 484 cut in the top edge of said rack 453. Opposite ends of the alining bar 483 fit loosely in vertical grooves in two bosses 508 (Figs. 19 and 29) one on the frame 81 and one on the frame 82. The bar 483 has two notches which fit loosely the rounded ends of two symmetrical arms 485 secured on a shaft 486 journaled in the frames 81 and 82. Secured on the rearward end of the shaft 486 (see also Fig. 31) is a crank 487 connected to an operating pitman 488 which is bifurcated to embrace the shaft 412. The pitman 488 carries a roller 489 which cooperates with a cam groove 490 cut in the face of the gear 411.

It will be recalled by referring to Fig. 14 that the actuator 146 which operates the latch mechanism for the clerk's differential is secured on the shaft 138 and consequently oscillates back and forth in unison with said shaft and the universal rod 210. After the actuator 146 has completed its initial clockwise movement to differentially position the segment 151 and the rack 453 (Fig. 32) rotation of the gear 411 (Fig. 31) by means of the cam groove 490 imparts downward movement to the pitman 488 to rock the shaft 486 clockwise to cause the alining bar 483 to enter the proper notch 484 to aline the rack 453. After the perforating control bars 461 and 462 (Fig. 32) have been differentially positioned, clockwise movement of the cams 479 and 480 (see also Fig. 16) rock the lever 476 counterclockwise, which by means of the link 475 imparts clockwise movement to the arm 474, the shaft 467 and the arms 458 and 466. This causes the sleeve 464 to move the bars 461 and 462 downward whereby the projections 468 force the proper combination of the four perforating punches 469 through the price ticket to perforate the code of the clerk's number therein. The arms 471 and bail 472 move down simultaneously with the bars 461 and 462, and consequently do not interfere with the perforating movement of the punches 469. After the perforating is completed, return movement counterclockwise of the arms 458 and 466 and the bail 472 causes said bail in cooperation with the shoulders on the punches 469 to return said punches upwardly to normal positions as shown in Fig. 32. The cam race 490 then disengages the liner 483 from the rack 453 and the actuator 146 then restores the clerks' differential mechanism to normal position.

*Transaction perforating mechanism*

Calling attention to Fig. 6, the differential segment 303 is connected by a link 491 to a crank 492 secured on the shaft 382. Also secured on the shaft 382 is a segmental gear 493 which meshes with a gear 494 secured on a shaft 495 opposite ends of which are journaled in the frame 81 and the bar 379. Secured on the shaft 495 is a segmental gear 496 (see also Figs. 19, 29 and 32) which meshes with a transaction perforator control rack 497 having connected thereto punch selecting and operating bars 498 and 499. The rack 497 and bars 498 and 499 are similar in every respect to the clerk's rack 453 (see also Fig. 32) and bars 461 and 462, and in cooperation with a set of punches (not shown), similar to the punches 469, perforates the code of a number corresponding to the depressed transaction key 39, 40 or 41 in the proper space of the price ticket.

It is to be understood that while only three transaction keys are here shown, any number up to a full complement of nine keys may be used if desired.

*Machine number perforating mechanism*

Directing attention to Figs. 19 and 29, mechanism to perforate the number of the machine in the price ticket is provided, and includes a rack 500, similar in every respect to the clerk's number rack 453 (Fig. 32). The rack 500 has two horizontal slots 501 which embrace antifriction rollers loose on the studs 460. Punch selecting and operating bars 502 and 503, similar to the bars 461 and 462 for the clerk's number perforating mechanism, are connected to the rack 500 and have projections 504 which cooperate with four punches 505 to perforate the code of the number of the machine in the price ticket in exactly the same way as described for the clerk's mechanism. A stud 506 (Figs. 2 and 19) secured in the frame 81, cooperates with notches 507 in the rack 500 to provide a means of adjusting and securing said rack in any of its ten positions. It is to be understood that such an adjustment of the rack 500 is more or less of a permanent nature, as it is not often necessary to change the number of a register. It will be noted that the portion of the lining bar 483 (Fig. 19) opposite the notches 507 of the rack 500 is cut away to provide clearance for the stud 506.

A receptacle 533 (Fig. 19) is provided to receive the punchings from the perforating mechanism. The receptacle 533 is slidably mounted on angular ways 534 extending between the frames 81 and 82. A closure 535 (Fig. 1) in the cabinet 83 gives access to the receptacle when it is desired to remove the punchings therefrom.

*Price ticket ejecting mechanism*

After interpreting and perforating is completed, the price ticket is ejected from its carrier, passed through a ticket chute 510 (Fig. 19) supported between the frames 81 and 82, through an opening in the cabinet 83 and a similar opening in the receptacle 315, and finally deposited in said receptacle. The ticket chute 510 is mounted between the frames 81 and 82 by various studs and screws in said frames in cooperation with bent over ears on said chute. Hook-shaped brackets on the cabinet and on the receptacle provide a means of removably mounting said receptacle on said cabinet. The receptacle 315 has a closure 511 for removing the price tickets therefrom, said closure having a lock 512, the bar of which, in cooperation with the edge of the price ticket opening in the cabinet provides a means for locking the closure shut and for securing the receptacle 315 to the cabinet. The price ticket receptacle has an aperture 513 near its top for the purpose of ascertaining when the receptacle is filled with price tickets.

Referring to Figs. 22 and 30, the pitman 436 has a foot-shaped extension 514 adapted to cooperate with a stud 515 in an arm 516 of a yoke 517 loose on a stud 518 secured in the frame 82. A lefthand arm of the yoke 517 rotatably supports a tension roller 519 adapted to cooperate with an ejector roller 520 (Fig. 19) secured on a shaft 521 journaled in the frame 319. When the ticket carriage 314 (Fig. 26) is moved to operating position, an opening 522 therein registers with an opening 523 in the die plate 318.

Clockwise rotation of the cams 433 and 434 (Figs. 16, 22 and 30) shifts the pitman 436 toward the left in the manner previously explained. A spring 524 stretched between the pitman 436 and the arm 516 of the yoke 517 causes said yoke to move clockwise in unison with said pitman 436 to move the tension roller 519 upwardly through the openings 523 and 522 and into engagement with the price ticket (see also Fig. 19). The tension roller 519 carries the righthand edge of the price ticket upwardly out of the path of the locating projections 321 on the ticket carriage and into resilient contact with the ejector roll 520.

Secured on the rearward end of the shaft 521 (Figs. 29 and 31) is a pinion 525 meshing with a segment 526 loose on a stud 527 fast in the frame 82. The segment 526 is connected by a link 528 to a cam lever 529 loose on the stud 477. The lever 529 carries a roller 530 which cooperates with the periphery of a check ejector cam 531 assembled with the cams 479 and 480 (Fig. 32) and the gear 482, so as to form an integral unit. A spring 532 urges the segment 526 clockwise to normally maintain it in contact with a stop stud 533 in the frame 82. The spring 532 also maintains the roller 530 in contact with the periphery of the cam 531.

At the beginning of the machine operation and prior to the time that the tension roller 519 (Figs. 16 and 19) impinges the price ticket against the ejector roller 520, clockwise movement of the cam 531 rocks the lever 529 counterclockwise and the link 528 imparts similar movement to the segment 526 to rotate the shaft 521 and the roller 520 in a reverse or clockwise direction. Near the end of the machine operation, after the interpreting and perforating of the price ticket has been completed and after the tension roller 519 has impinged the price ticket against the ejector roller, the roller 530 rides off an abrupt step in the periphery of the cam 531 thereby releasing the price ticket ejector mechanism to the action of the spring 532. The spring 532 imparts instantaneous clockwise movement to the segment 526 to rotate the shaft 521 and the ejector roller 520 counterclockwise to eject the price ticket from the carriage 314 through the chute 510 and into the receptacle 315. Immediately after the price ticket is ejected the cams 433 and 434 (Fig. 22) shift the pitman 436 toward the right to impart counterclockwise movement to the yoke 517 to move the tension roller 519 to ineffective position.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described having a totalizer and adapted to pick up data from perforated record material and enter these data into the totalizer, the combination of a plurality of elements; means to resiliently move the elements to effective positions under control of the perforations in the record material; means controlled by the elements to enter the data into the totalizer; means to condition the machine for total taking operations; means operated by the conditioning means; and means controlled by the last-named means to retain the elements in ineffective positions in total taking operations.

2. In a machine of the class described, having a totalizer into which data are entered under the influence of perforated record material, the combination of resiliently urged means to sense the perforations in the record material; means to control the movement of the sensing means into effective position; means controlled by the sensing means to enter the data into the totalizer; means to control the movement of the entering means into communication with the sensing means; means to condition the machine for total taking operations; and means operated by the conditioning means to render both controlling means inoperative during total taking operations.

3. In a machine of the class described, having a totalizer into which amounts are entered under the influence of perforated record material, the combination of means to sense the perforated record material; means to control the operation of the sensing means and to return the sensing means to ineffective position near the end of the machine operation and to retain said sensing means in ineffective position when the machine is at rest; means including a reciprocating bar to release the machine for operation; connections between the bar and the returning and retaining means to render said returning and retaining means ineffective upon release of the machine; means normally blocking releasing movement of the bar; a total control lever; and means operated by movement of the total control lever from adding to total taking position to prevent operation of the second-named means to retain the sensing means ineffective during the machine operation, said operated means also adapted to move the blocking means to ineffective position to permit operation of the machine.

4. In a machine of the class described, the combination of a totalizer; actuators therefor, said actuators adapted to be differentially adjusted in add operations under the influence of perforated record material; means to sense amounts from the record material; means coacting with the sensing means and connected directly to the actuators; and means cooperating with and arrested by the last-named means to translate the condition of the sensing means to a value to transmit the value to the actuators.

5. In a machine of the character described, having a totalizer; actuators for the totalizer by means of which amounts are entered under the influence of perforated record material, the combination of yieldingly urged means to sense the perforations in the record material, said sensing means including fingers, which when they register with the perforations in the record material allow the sensing means to move to effective position; means to retain the sensing means in ineffective position when the machine is at rest; resiliently urged means connected with the actuators adapted to cooperate with the sensing means to control the actuators to enter amounts into the totalizer; means to retain the resiliently urged means in ineffective position when the machine is at rest; a total control device; means operated by the total control device and cooperating with the retaining means for the sensing means to render said sensing means inoperative during total taking operations; and means on the retaining means for the sensing means cooperating with the retaining means for the resiliently urged means to render said resiliently urged means inoperative during total taking operations.

6. In a machine of the class described, the combination of sensing means to sense data on record material, said sensing means provided with sensing fingers at one of their ends and stops at the other one of their ends, said stops being set in accordance with the data sensed by the fingers, a differentially positionable member, a device pivoted to the differential member, said device provided with notches, and means to move the differential member and device relatively to the set stops, whereby the set stops coact with certain notches to arrest the device and thereby the differential member in a position determined by the setting of the stops under control of the data on the record.

7. In a machine of the class described, the combination of sensing devices to sense data on record material, said sensing devices provided with stops settable under control of data on the record material whereby the stops are set in accordance with the value of the data sensed by the sensing devices, a differential means, and a comparing device connected to the differential means and adapted to coact with the stops, whereby the differential is set according to the value which the setting of the stops represents.

8. In a machine of the class described, the combination of a differential device, operating means for the differential device, a member having a series of notches thereon representing a code connected to the differential device, pivoted sensing members coacting with a record material to control the setting of the pivoted members according to the data thereon, means to lock the pivoted sensing members in the position they are set under control of the data on the record material, and means to thereafter move the notched member into contact with and relatively to the sensing members until the notched members are stopped by the pivoted sensing members thus arresting the differential device in a position as determined by the setting of the locked sensing members.

9. In a machine of the class described, the combination of a differential device; a single member movably connected with the differential device, said single member having a series of notches thereon representing a code; a plurality of pivoted sensing members simultaneously cooperating with record material to sense combinational representations of digital values thereon; and operating means for the differential device to successively move the notches past the sensing members after the sensing members are set in accordance with the combinational representation on the record material, said plurality of sensing members also cooperating with the notches in the single member as the member and notches are successively moved past the plurality of sensing members, to control the differential positioning of the differential device.

10. In a machine of the class described, the combination of a differential device; a single member having a series of notches thereon comprising combinational representations of digital values, said member connected with the differential device for movement therewith and relative thereto; a plurality of sensing members coacting with record material to sense combinational representations of digital values thereon and to be set according to the combinational representations on the record material; means operable to move the differential device and through the differential device, move the single notched member past the set sensing members; and means to move the single notched member into engagement with the plurality of set sensing members to arrest the single notched member and the differential device in various positions to thereby translate the combinational setting of the sensing members into the true digital value represented by the combination.

SAMUEL BRAND.